(12) United States Patent
Sutton et al.

(10) Patent No.: US 11,680,152 B2
(45) Date of Patent: Jun. 20, 2023

(54) RECYCLABLE POLYMERS FROM ENVIRONMENTALLY BENIGN BUILDING BLOCKS

(71) Applicant: Triad National Security, LLC, Los Alamos, NM (US)

(72) Inventors: Andrew D. Sutton, Los Alamos, NM (US); Christopher David Roland, Los Alamos, NM (US); Cameron M. Moore, Los Alamos, NM (US)

(73) Assignee: Triad National Security, LLC, Los Alamos, NM (US)

( * ) Notice: Subject to any disclaimer, the term of this patent is extended or adjusted under 35 U.S.C. 154(b) by 81 days.

(21) Appl. No.: 17/321,849

(22) Filed: May 17, 2021

(65) Prior Publication Data
US 2021/0371617 A1    Dec. 2, 2021

Related U.S. Application Data

(60) Provisional application No. 63/039,814, filed on Jun. 16, 2020, provisional application No. 63/033,452, filed on Jun. 2, 2020.

(51) Int. Cl.
C08G 64/40    (2006.01)
C08J 11/24    (2006.01)
C08G 64/02    (2006.01)

(52) U.S. Cl.
CPC ........... C08J 11/24 (2013.01); C08G 64/0208 (2013.01); C08G 64/403 (2013.01); C08J 2367/04 (2013.01)

(58) Field of Classification Search
CPC ..... C08J 11/24; C08G 64/0208; C08G 64/403
USPC .......................................................... 521/48
See application file for complete search history.

(56) References Cited

FOREIGN PATENT DOCUMENTS

| EP | 0930311 | * | 7/1999 |
| WO | WO2010036884 | * | 4/2010 |

OTHER PUBLICATIONS

Michael E. Jung et al. Total Synthesis of (i?)-Glycerol Acetonide and the Antiepileptic and Hypotensive Drug(-)-7-Amino-/5-hydroxybutyric Acid (GABOB): Use of Vitamin C as a Chiral Starting Material, ; J. Am. Chem. Soc., 102, 6304 (Year: 1980).*

* cited by examiner

*Primary Examiner* — Terressa Boykin
(74) *Attorney, Agent, or Firm* — Klarquist Sparkman, LLP

(57) ABSTRACT

Disclosed herein are embodiments of a method for making recyclable polymers and a method for decomposing the polymers back to the monomers which can then be reused. The polymer are stable to aqueous and/or acid conditions and may have a formula II

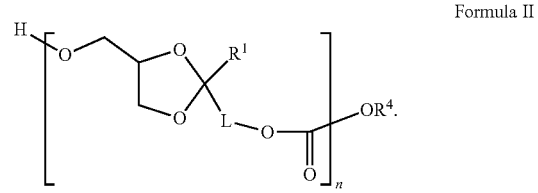

Formula II The method to decompose the polymer back to the monomers may comprise heating the polymer in a protic organic solvent.

16 Claims, 14 Drawing Sheets

RECYCLABLE POLYMERS FROM ENVIRONMENTALLY BENIGN BUILDING BLOCKS

CROSS REFERENCE TO RELATED APPLICATION

This application claims the benefit of the earlier filing date of U.S. provisional patent application No. 63/033,452, filed on Jun. 2, 2020 and U.S. provisional application No. 63/039,814, filed on Jun. 16, 2020, both of which are incorporated herein by reference in their entireties.

ACKNOWLEDGMENT OF GOVERNMENT SUPPORT

This invention was made with government support under Contract No. 89233218CNA000001 awarded by the U.S. Department of Energy/National Nuclear Security Administration. The government has certain rights in the invention.

FIELD

This disclosure concern embodiments of a method for making a recyclable polymer and embodiments of a method for recycling the polymer.

BACKGROUND

Since their invention, petroleum-based plastics have become an increasingly ubiquitous part of day to day life. From the phones and computers used daily, to food packaging, and automotive parts, petroleum-based plastics are everywhere. Most petroleum-based plastics are extremely durable, which makes them highly versatile and indispensable in modern life. However, this durability becomes a problem when plastics reach end-of-life. As of 2015, humans had produced 8300 million tons of plastic from petroleum-based sources. These plastics are durable, possess many desirable physical properties, and in many cases last lifetimes. As a result of this plastic production, humans have also produced over 6300 million tons of plastic waste. Only a small fraction has been recycled (9%, 600 million tons) or incinerated (12%, 800 million tons), while the vast majority of the plastic waste humans have produced over the last 70 years has ended up being discarded in landfills or the ocean. While the percentage of plastic waste that is recycled is increasing yearly, plastic accumulation in the environment also increases every year. Besides just accumulating in the environment, many plastics have other negative environmental effects. Additives in plastics can leech into the environment, or small microplastics can be directly ingested by wildlife. Petroleum based plastics and additives have also been detected bioaccumulating in humans.

SUMMARY

Disclosed herein are embodiments of a method for making a polymer comprising forming a mixture comprising a monomer compound according to Formula I, a carbonyl compound according to Formula III, and a base;

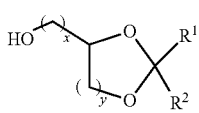

Formula I

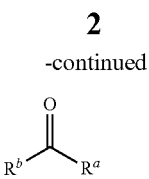

Formula III heating the mixture to a first temperature of from 80° C. to 150° C. for a first time period, such as a first time period of from greater than zero to 4 hours, then heating the mixture to a second temperature of from greater than 150° C. to 300° C. for a second time period, such as a second time period of from greater than zero to 36 hours, and isolating a polymer according to Formula II

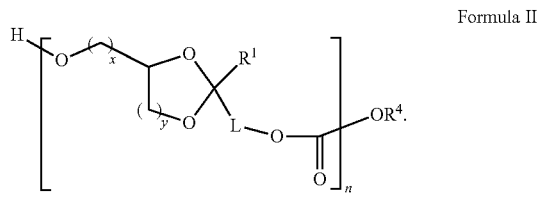

Formula II

With respect to Formulas I, II and III, $R^1$ is alkyl or OH, such as OH or $CH_3$; $R^2$ is aliphatic substituted with OH; $R^4$ is H, $C_{1-6}$alkyl, or phenyl; $R^5$ is aliphatic; each of $R^a$ and $R^b$ independently is Cl, $OCCl_3$, OPh, or $OC_{1-6}$alkyl; L is $C_{1-6}$alkyl or $C_{2-6}$alkenyl; n is 2 to 500; x is 1, 2, 3, 4, 5 or 6; and y is 1 or 2.

In some embodiments, x is 1 and/or y is 1.

$R^2$ is -L-OH.

And in some embodiments, the compound has a structure according to Formula I-B:

Formula I-B

In some embodiments, the carbonyl compound is diphenylcarbonate. And/or the base may be a hydride base, such as potassium hydride, or sodium hydride.

The method may further comprise introducing a vacuum while heating the mixture to the second temperature. The vacuum may reach a pressure of less than 500 mtorr, such as a pressure of from greater than zero to 250 mtorr.

The mixture may comprise a solvent, but in some embodiments, the reaction is performed neat, i.e., without a separately added solvent.

Also disclosed herein are embodiments of a method for recycling and/or decomposing the polymer. The method may comprise forming a mixture comprising a protic organic solvent and a polymer according to the present disclosure, and heating the mixture to a temperature of from 30° C. to 150° C. or more, such as from 40° C. to 100° C. The mixture may be heated for a time period of from greater than zero to 7 days, such as from 12 hours to 3 days.

In any embodiments, the protic organic solvent may be an aliphatic alcohol, such as methanol, ethanol, propanol, or a combination thereof, or the protic organic solvent may be an aromatic alcohol, such as phenol. Additionally or alternatively, the mixture may further comprise a co-solvent, such as acetone, toluene, xylene, methyl ethyl ketone, dimethylformamide, acetonitrile, or a combination thereof.

In particular disclosed embodiments, the protic organic solvent is methanol, and mixture is heated to a temperature of from 40° C. to 75° C. for 3 days.

The method may further comprise isolating a recycled monomer that may be used to form a recycled polymer, such as a polymer according to the present disclosure. In some embodiments, the method is a method for recycling a polymer, comprising forming a mixture comprising a protic organic solvent and a polymer according to any of the disclosed embodiments, heating the mixture to a temperature of from 30° C. to 150° C., isolating a recycled monomer, and forming a recycled polymer using the recycled monomer. In certain embodiments, the method comprises forming a mixture comprising an aliphatic alcohol and the polymer according to any of the disclosed embodiment, heating the mixture to a temperature of from 40° C. to 100° C. for a time period of from 12 hours to 3 days, isolating the recycled monomer, and forming the recycled polymer using the recycled monomer.

The foregoing and other objects, features, and advantages of the invention will become more apparent from the following detailed description, which proceeds with reference to the accompanying figures.

DETAILED DESCRIPTION

I. Definitions

Figure 1:
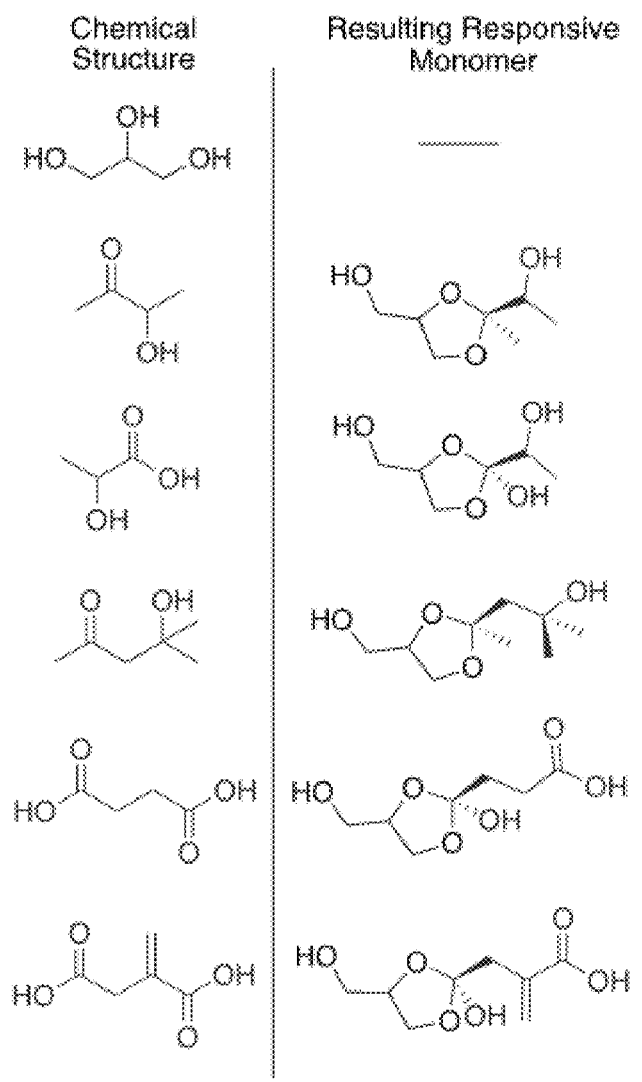
FIG. 1 is a table providing exemplary monomers suitable for use in the disclosed technology.

The following explanations of terms and methods are provided to better describe the present disclosure and to guide those of ordinary skill in the art in the practice of the present disclosure. The singular forms "a," "an," and "the" refer to one or more than one, unless the context clearly dictates otherwise. The term "or" refers to a single element of stated alternative elements or a combination of two or more elements, unless the context clearly indicates otherwise. As used herein, "comprises" means "includes." Thus, "comprising A or B," means "including A, B, or A and B," without excluding additional elements. All references, including patents and patent applications cited herein, are incorporated by reference in their entirety, unless otherwise specified.

Unless otherwise indicated, all numbers expressing quantities of components, molecular weights, percentages, temperatures, times, and so forth, as used in the specification or claims, are to be understood as being modified by the term "about." Accordingly, unless otherwise indicated, implicitly or explicitly, the numerical parameters set forth are approximations that may depend on the desired properties sought and/or limits of detection under standard test conditions/methods. When directly and explicitly distinguishing embodiments from discussed prior art, the embodiment numbers are not approximates unless the word "about" is expressly recited.

Unless explained otherwise, all technical and scientific terms used herein have the same meaning as commonly understood by one of ordinary skill in the art to which this disclosure pertains. Although methods and materials similar or equivalent to those described herein can be used in the practice or testing of the present disclosure, suitable methods and materials are described below. The materials, methods, and examples are illustrative only and not intended to be limiting.

When chemical structures are depicted or described, unless explicitly stated otherwise, all carbons are assumed to include implicit hydrogens such that each carbon conforms to a valence of four. For example, in the structure on the left-hand side of the schematic below there are nine hydrogen atoms implied. The nine hydrogen atoms are depicted in the right-hand structure.

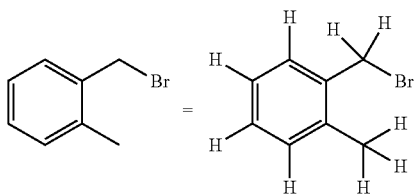

Sometimes a particular atom in a structure is described in textual formula as having a hydrogen or hydrogen atoms, for example —CH$_2$CH$_2$—. It will be understood by a person of ordinary skill in the art that the aforementioned descriptive techniques are common in the chemical arts to provide brevity and simplicity to description of organic structures.

"Aliphatic" refers to a substantially hydrocarbon-based group or moiety. An aliphatic group or moiety can be acyclic, including alkyl, alkenyl, or alkynyl groups, cyclic versions thereof, such as cycloaliphatic groups or moieties including cycloalkyl, cycloalkenyl or cycloalkynyl, and further including straight- and branched-chain arrangements, and all stereo and position isomers as well. Unless expressly stated otherwise, an aliphatic group contains from one to twenty carbon atoms (C$_{1-20}$); for example, from one to fifteen (C$_{1-15}$), from one to ten (C$_{1-10}$) from one to six (C$_{1-6}$), or from one to four carbon atoms (C$_{1-4}$) for an acyclic aliphatic group or moiety, or from three to fifteen (C$_{3-15}$) from three to ten (C$_{3-10}$), from three to six (C$_{3-6}$), or from three to four (C$_{3-4}$) carbon atoms for a cycloaliphatic group or moiety. An aliphatic group may be substituted or unsubstituted, unless expressly referred to as an "unsubstituted aliphatic" or a "substituted aliphatic."

"Alkyl" refers to a saturated aliphatic hydrocarbyl group having from 1 to 20 (C$_{1-20}$) or more carbon atoms, more typically 1 to 10 (C$_{1-10}$) carbon atoms such as 1 to 6 (C$_{1-6}$) carbon atoms or 1 to 4 (C$_{1-4}$) carbon atoms. An alkyl moiety may be substituted or unsubstituted. This term includes, by way of example, linear and branched hydrocarbyl groups such as methyl (CH$_3$), ethyl (—CH$_2$CH$_3$), n-propyl (—CH$_2$CH$_2$CH$_3$), isopropyl (—CH(CH$_3$)$_2$), n-butyl (—CH$_2$CH$_2$CH$_2$CH$_3$), isobutyl (—CH$_2$CH$_2$(CH$_3$)$_2$), sec-butyl (—CH(CH$_3$)(CH$_2$CH$_3$), or t-butyl (—C(CH$_3$)$_3$).

"Aromatic" refers to a cyclic, conjugated group or moiety of, unless specified otherwise, from 5 to 15 ring atoms having a single ring (e.g., phenyl, pyridinyl, or pyrazolyl) or multiple condensed rings in which at least one ring is aromatic (e.g., naphthyl, or indolyl), that is at least one ring, and optionally multiple condensed rings, have a continuous, delocalized π-electron system. Typically, the number of out of plane π-electrons corresponds to the Hückel rule (4n+2). The point of attachment to the parent structure typically is through an aromatic portion of the condensed ring system.

For example,

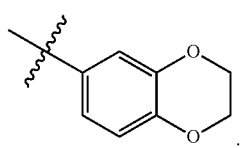 [SMILES: *c1ccc2c(c1)OCCO2]

An aromatic group or moiety may comprise only carbon atoms in the ring, such as in an aryl group or moiety, or it may comprise one or more ring carbon atoms and one or more ring heteroatoms comprising a lone pair of electrons (e.g. S, O, N, P, or Si), such as in a heteroaryl group or moiety. Unless otherwise stated, an aromatic group may be substituted or unsubstituted.

"Aryl" refers to an aromatic carbocyclic group of, unless specified otherwise, from 6 to 15 carbon atoms having a single ring (e.g., phenyl) or multiple condensed rings in which at least one ring is aromatic (e.g., 1,2,3,4-tetrahydronaphthalene, and the like). If any aromatic ring portion contains a heteroatom, the group is heteroaryl and not aryl. Aryl groups may be, for example, monocyclic, bicyclic, tricyclic or tetracyclic. Unless otherwise stated, an aryl group may be substituted or unsubstituted.

"Halo," "halide" or "halogen" refers to fluoro, chloro, bromo or iodo.

II. Overview

When designing polymers for sustainable end-of-life it is prudent to consider the effectiveness of current plastic recycling. Recycling is obviously a positive, but faces many challenges. Perhaps most important is difficulty in collection and recovery of recyclables. Once collected, plastics that are economical to recycle—primarily rigid containers—must be separated from the waste stream. If the plastic is contaminated with food or other waste, or mixed with incompatible plastics then the recyclable plastic is sent to the landfill. Even with best practices, the reality is that some portion of any plastic, no matter how recyclable, will enter the environment. Due to this, even when using plastics that are recyclable, long term environmental compatibility must be considered. Even plastics that are currently considered biodegradable or industrially compostable are affected by this problem. The conditions under which plastics are biodegradable or industrially compostable are often niche and unlikely to be found where these plastics are most likely to end up, potentially giving consumers a false sense of "green-ness" in their plastic products.

Another way to avoid long-term environmental impact of plastic accumulation is to make plastics that don't accumulate, but rather degrade. A popular method to induce degradation is to include labile bonds along the polymer backbone, allowing for selective scission of those bonds. While not an exhaustive list there are many examples of responsive polymers that have been tuned to respond to pH changes, UV light, and temperature changes, among others. One common reversible reaction that has been used on occasion in polymer synthesis, but is perhaps still underexplored in responsive polymers is ketalization or acetalization. This is a common protecting group in organic synthesis formed between a diol and a ketone/aldehyde, a general example is shown in scheme 1.

Scheme 1: General form of an acetalization/ketalization reaction between a diol and carbonyl to form a 1,3 dioxolane.

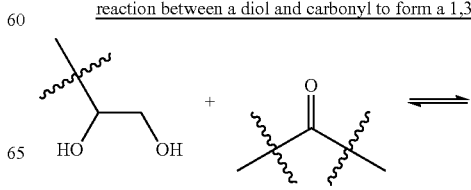

-continued

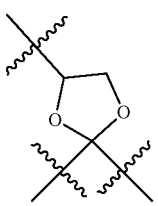

Often used as a protecting group for aldehydes and ketones in synthetic organic chemistry, a carbonyl can be converted into cyclic alkyl ethers, expelling water, and reversibly converted back to the carbonyl in the presence of acid or water.

If plastic producers must consider long term environmental effects of all plastics they manufacture, a clever solution would be to produce plastics out of things already present in the environment. An excellent example of successfully creating useful material from biosourced molecules was recently reported wherein reversible synthesis of polymers based on γ-butyrolactone was achieved through thermolysis and catalytic zinc. In order to even have the potential to compete with polyolefins, biosourced starting materials must be extremely cheap. An ideal candidate molecule to achieve this is glycerol. Glycerol is a byproduct of biodiesel production—about 1 pound of glycerol is produced per 10 pounds biodiesel—and as the biodiesel industry has expanded the production of glycerol has as well. As the supply has increased prices have plummeted, and it is increasingly compelling to find valuable uses for glycerol. Glycerol is an important feedstock chemical, and can also be used to produce other chemicals, such as hydroxyacetone (acetol) via dehydration. While glycerol can be incorporated into polymers in several ways, current applications are somewhat limited.

Disclosed herein are embodiments of a method for preparing useful monomers and related condensation polymers from glycerol and glycerol derivatives such as hydroxyacetone. By combining glycerol and the glycerol derivative hydroxyacetone, diol monomers amenable to condensation polymerization can be easily synthesized. One specific example is the reaction of glycerol with hydroxyacetone (scheme 2).

Scheme 2: Synthesis of ketal diol from glycerol and the glycerol derivative hydroxyacetone.

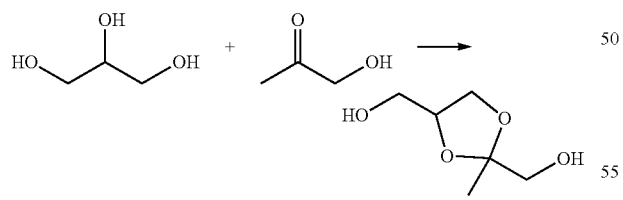

The ideal case for new plastic development is creating a new product with similar properties to existing technology with some performance advantage or a "drop-in" replacement. Performance advantages can come in the form of superior material properties, lower costs, or an improved environmental impact that would encourage stakeholders to transition to new materials. Ketals produced from glycerol offer the potential of a performance advantage in environmental impact when compared with aliphatic diol monomers derived from petroleum, often found in polycarbonates (PCs). Polycarbonates are primarily divided into two categories, aliphatic PCs made from aliphatic diols, and aromatic PCs typically containing bisphenol A (BPA) or similar derivatives. Aromatic PCs are extremely useful as thermoplastics, and are common in automotive applications, heat resistant applications, and compact discs. In contrast to aromatic PCs, aliphatic PCs typically have lower glass transition temperatures (from −10° C. up to 40° C., compared to 150° C. for aromatic PCs) and are less heat resistant. While initially considered to be less useful due to poor thermal properties, recently aliphatic PCs have seen more use in medical applications due to excellent biocompatibility. Aliphatic polycarbonates have also been shown to be biodegradable or depolymerizable under certain conditions, but are typically limited by poor solubility in water and poor transport into cells.

Disclosed herein are embodiments of a ketal derived from glycerol that is useful as a drop-in replacement for aliphatic diols used in polycarbonate synthesis. Using a glycerol derived monomer offers several potential performance advantages. Most notably, the glycerol monomer replaces a petroleum-based feedstock with a bioderived one. Besides moving from petroleum based to biobased, ketal reversibility can provide a potential synthetic handle to selectively induce polymer degradation upon reaching end-of-life. In this case the monomer can be recycled or, over time, the monomer hydrolyzes to the original bio-based building blocks which would reduce environmental plastic accumulation. The synthesis, characterization, and de- and re-polymerization of glycerol based condensation polymers are described in this disclosure, and demonstrate encouraging progress towards a true "closed-loop" bioderived plastic cycle. Additionally, or alternatively, the disclosed monomers can be incorporated into 'standard or conventional' polycarbonates, such as polycarbonates formed from 1,4-butanediol, to form a mixed polycarbonate. Such mixed polycarbonates decompose using the disclosed techniques to a degree proportional to the amount of the disclosed monomer used to form the mixed polycarbonate.

III. Monomers

Monomers suitable for use in the present technology may have a general Formula I:

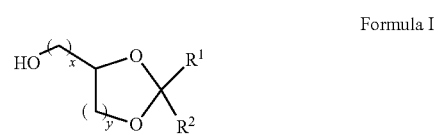

Formula I

With respect to Formula I, $R^1$ is alkyl or OH, such as $C_{1-6}$ alkyl or OH, $C_{1-4}$alkyl or OH, and may be $CH_3$ or OH.

$R^2$ is aliphatic, such as $C_{1-10}$aliphatic, substituted with OH. In some embodiments, $R^2$ is $C_{1-8}$alkyl or $C_{2-8}$alkenyl, substituted with OH. And in some embodiments, $R^2$ is straight chain or branched aliphatic, alkyl or alkenyl, optionally substituted with OH.

x is from 1 to 6 or more, such as 1, 2, 3, 4, 5 or 6, or from 1, 2, or 3. In some embodiments, x is 1.

y is 1 or 2, and in some embodiments, y is 1.

In certain embodiments, x is 1 and y is 1, and the monomer has a structure according to Formula I-A:

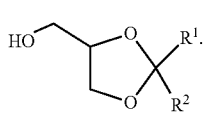

Formula I-A

With respect to Formula I-A, $R^1$ and $R^2$ are as defined for Formula I. In some embodiments of Formulas I or I-A, $R^2$ is -L-OH where L is $C_{1-6}$alkyl or $C_{2-6}$alkenyl. In certain embodiments, the monomer has a structure according to Formula I-B:

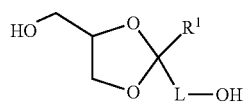

Formula I-B

With respect to Formula I-B, $R^1$ and L is as defined for Formulas I and I-A. In some embodiments, L is $C_{1-6}$alkyl. In certain embodiments, $R^1$ is alkyl, such as $C_{1-6}$alkyl, $C_{1-4}$alkyl or $CH_3$.

The monomer may be based on glycerol, acetoin, lactic acid, diacetone alcohol, succinic acid, itaconic acid, or a combination thereof. FIG. 1 provides a table of exemplary monomers and the starting material alcohol or acid. Exemplary monomers include, but are not limited to,

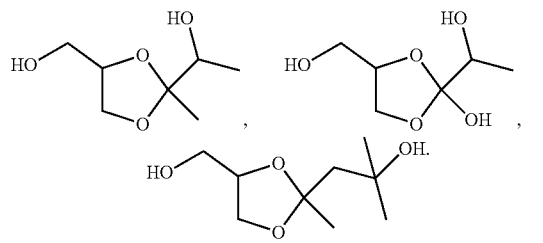

IV. Recyclable Polymers

Polymers suitable for use as recyclable polymers according to the present disclosure include polymers made from the monomers disclosed herein. In some embodiments, the polymers have a general Formula II:

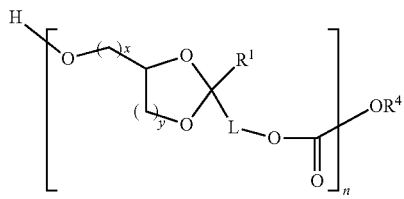

Formula II

With respect to Formula II, $R^1$, L, x and y are as previously defined for Formulas I, I-A and I-B. $R^4$ is H, $C_{1-6}$alkyl, or phenyl. n is 2 or more, such as from 2 to 500 or more, from 2 to 250, or from 2 to 100.

In some embodiments, x is y and y is 1, leading to a polymer having a formula II-A:

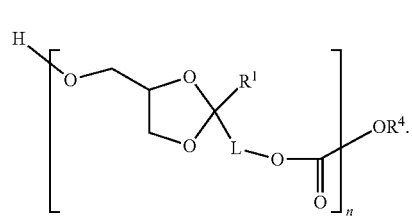

Formula II-A

Exemplary polymers include, but are not limited to,

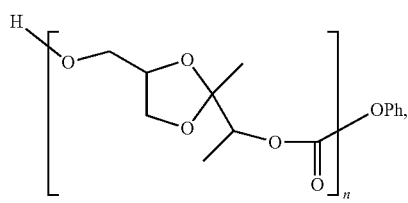

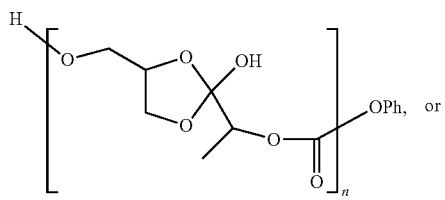

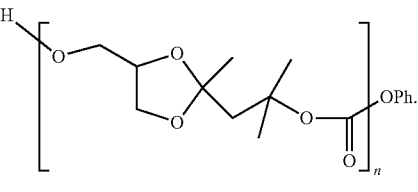

A. Method for Making the Polymers

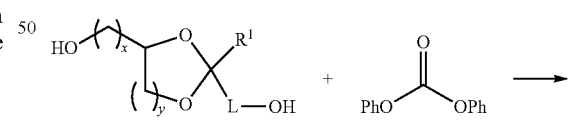

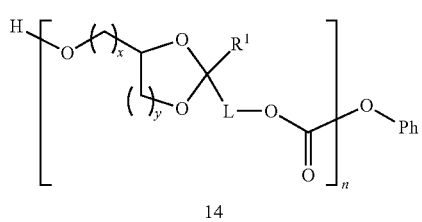

Compound 10 is treated with carbonyl compound 12 in the presence of a suitable base. The base may be any base suitable to facilitate the reaction, such as a hydride base, for example potassium hydride, or sodium hydride. In the example, compound 12 is diphenylcarbonate, but a person of ordinary skill in the art understands that other suitable carbonyl compounds could be used, such as a compound according to Formula III:

Formula III

With respect to Formula III, each of $R^a$ and $R^b$ independently is halogen, typically Cl; OC(halogen)$_3$, typically, OCCl$_3$; Oaryl, such as OPh; or OC$_{1-6}$alkyl. In some embodiments, $R^a$ and $R^b$ are the same, but in other embodiments they are different. In certain embodiments, compound 12 is selected from diaryl carbonate (for example, diphenylcarbonate), phosgene, diphosgene, triphosgene, dialkyl carbonate, such as dimethyl carbonate.

The reaction may be performed in a solvent suitable to facilitate the reaction, or it may be performed neat, i.e., without a solvent. And the reaction may be performed in an inert atmosphere, such as under a nitrogen or argon atmosphere.

The reaction may be performed in a vessel suitable to control the reaction pressure. The reaction may be heated to facilitate the reaction, such as to a temperature of from 120° C. to 300° C. or more, from 150° C. to 300° C., from 180° C. to 280° C. or from 200° C. to 240° C., and in some embodiments, the reaction is heated to 220° C.

In alternative embodiments, the reaction is heated to a first temperature and then subsequently heated to a second temperature. The reaction may be heated to a first temperature of from 80° C. or less to 150° C. or more, such as from 80° C. to 150° C., from 100° C. to 140° C. or from 110° C. to 130° C., and in some embodiments, the reaction is heated to 120° C. The reaction may be agitated, such as by stirring or shaking, and/or the reaction may be heated to the first temperature for a first time period suitable to facilitate deprotonation of the OH, which may be accompanied by hydrogen release. The first time period may be from greater than zero to 4 hours or more, such as from greater than zero to 3 hours, or from greater than zero to 2 hour. The reaction is then heated to the second temperature greater than the first temperature. The second temperature may be from 150° C. to 300° C. or more, such as from greater than 150° C. to 300° C., from 180° C. to 280° C. or from 200° C. to 240° C., and in some embodiments, the second temperature is 220° C.

In certain embodiments, a gradual vacuum is introduced during heating, such as during heating to the second temperature. The vacuum is introduced to remove at least a portion of any volatile bi-products formed during the reaction. For example, when diphenylcarbonate is used, the vacuum removes at least a portion of the phenol produced during the reaction. In some embodiments, the vacuum may reach a pressure of less than 500 mtorr, such as from greater than zero to 500 mtorr, from greater than zero to 300 mtorr, from greater than zero to 250 mtorr, from greater than zero to 200 mtorr, from greater than zero to 150 mtorr, or from greater than zero to 100 mtorr. The reaction may be heated, such as to the second temperature, and/or under vacuum, for a time period suitable to facilitate the reaction progressing towards completion, such as from greater than zero to 36 hours or more, from 12 hours to 24 hours, or from 16 hours to 20 hours. After cooling, such as to room temperature, the polymer is dissolved in a suitable solvent, such as a chlorinated solvent (for example, dichloromethane or chloroform) and washed with water, dried and isolated.

B. Method for Decomposing a Polymer Back to Reusable Monomers

A mixture is formed with the polymer and a protic organic solvent. The protic organic solvent may be an aliphatic alcohol, such as methanol, ethanol, propanol, or a combination thereof; an aromatic alcohol, such as phenol; or a combination thereof. The alcohol may also act as the solvent, or a co-solvent may be used, such as acetone, toluene, xylene, methyl ethyl ketone, dimethylformamide, acetonitrile, or a combination thereof.

The mixture is heated to a temperature suitable to facilitate depolymerization and reforming the monomer. The temperature may be from 40° C. or less to 150° C. or more, such as from 45° C. to 125° C., from 50° C. to 100° C., or from 50° C. to 75° C., and in some embodiments, the mixture is heated at 50° C. Additionally, or alternatively, the mixture may be heated to a boiling point of the solvent or solvent mixture. And the mixture may be heated for a time period suitable to facilitate degradation of the polymer, such as from greater than zero to 7 days or more, from 1 hours to 5 days, from 4 hours to 3 days, from 6 hours to 2 days, or from 12 hours to 36 hours. In certain embodiments, the mixture is heated for 15 hours. After heating, the mixture is allowed to cool and dried, i.e., the solvent is removed.

V. Examples

General Considerations

All chemicals were purchased from Sigma Aldrich and were used as received unless otherwise stated. Diphenylcarbonate was recrystallized from warm ethanol. All GPC measurements were made using an Agilent Infinity II 1260 series equipped with two Agilent Resipore© 300×7.5 mm diameter columns in THF at 40° C. with a flow rate of 1.0 mL/min. $^1$H and $^{13}$C NMR spectra were collected at room temperature on a Bruker AV400 MHz spectrometer, with chemical shifts referenced to the residual solvent signal. GC-MS analysis was carried out using an Agilent 7890 GC system equipped with an Agilent 5975 mass selective detector (MSD), a flame ionization detector (FID), and a Polyarc system. The Polyarc system is a catalytic microreactor that converts all organic compounds to methane after chromatographic separation and prior to detection. Differential scanning calorimetry (DSC) measurements were performed using a Netzsch DSC 204 F1 Phoenix with a Netzsch CC300 LN2 cryostat in sealed aluminum pans.

Example 1

Synthesis of Benzyl Glycidyl Ether

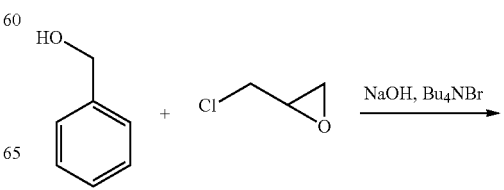

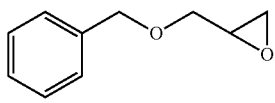

To a 500 mL round bottom flask with stir bar, tetrabutylammonium bromide (2.74 g, 8.5 mmol, 0.04 eq.) and epichlorohydrin (35.4 g, 29.9 mL, 383 mmol, 1.8 eq.) were added. Separately, a 50% by mass sodium hydroxide (22.14 g, 553.7 mmol, 2.6 eq.) solution in water was prepared. Once this solution had cooled to room temperature the sodium hydroxide solution was added to the round bottom flask. The resulting mixture was stirred and cooled to 0° C. in an ice bath. Benzyl alcohol (23.0 g, 22 mL, 212 mol, 1 eq.) was added dropwise over two hours. Upon completion of benzyl alcohol addition, the ice bath was allowed to warm to room temperature and the solution left to stir overnight. An additional 150 mL of water was then added to the solution, the solution was washed with 75 mL of ethyl acetate three times. The organic phase was separated, dried with magnesium sulfate and evaporated in vacuo. The resulting clear oil (33.76 g, 205.8 mmol, 97.1% yield) is benzyl glycidyl ether in sufficient purity to be used directly in the next step.

Example 2

Synthesis of 3-(benzyloxy)-1,2-propanediol

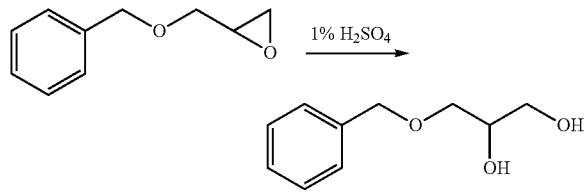

Benzyl glycidyl ether (33.76 g, 205.8 mmol, 1 eq.) was added to a 500 mL round bottom flask with stir bar. Deionized water (350 mL) was added and stirring initiated. Concentrated sulfuric acid (3.5 mL) was added to this solution dropwise at room temperature. The solution was allowed to stir overnight, reaction progress can be monitored by sampling the organic phase via halting stirring and allowing organic and aqueous phases to separate. Upon reaction completion the solution was brought to neutral pH via slow addition of solid potassium carbonate. The resulting aqueous solution was washed 3× with 75 mL ethyl acetate, separating the organic phase. The organic phase was dried with magnesium sulfate, filtered, and volatiles evaporated to yield 3-(benzyloxy)-1,2-propanediol (32.96 g, 181.1 mmol, 87.9% yield) as a clear oil.

Example 3

Synthesis of 2-methyl-2-methanol-4-benzyloxy-1,3-dioxolane (1)

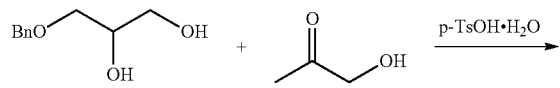

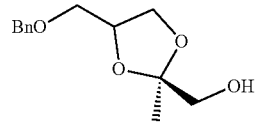

To a 500 mL round bottom flask with stir bar 3-(benzyloxy)-1,2-propanediol (47.3 g, 258 mmol, 1 eq.) was added. The oil was dissolved in 150 mL of benzene. Hydroxyacetone (22.93 g, 309.9 mmol, 1.2 eq.) was added in one shot, followed by paratoluenesulfonic acid monohydrate (1.47 g, 7.74 mmol, 0.03 eq.). This solution was heated to reflux overnight in a dean stark apparatus. The volume of water collected was monitored to track reaction progress. Upon reaction completion the flask was cooled, dried in vacuo, and the residue taken up in 150 mL of ethyl acetate. This solution was washed with 50 mL deionized water three times, and then the organic layer was dried with magnesium sulfate, filtered, and dried in vacuo. The resulting yellow oil is the product 1 (45.3 g, 190.3 mmol, 73.7% yield).

Example 4

Synthesis of 2-methyl-1,3-dioxolane-2,4-dimethanol (2)

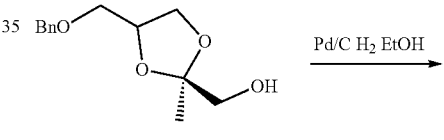

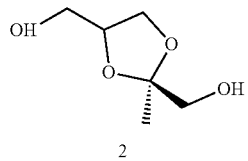

To a 250 mL round bottomed flask equipped with stir bar 2-methyl-2-methanol-4-benzyloxy-1,3-dioxolane 1 (12.68 g, 53.3 mmol, 1 eq.) was added. The oil was dissolved in 100 mL of 200 proof ethanol. Palladium on carbon (10 wt %) was added to the flask and stirring began. The flask was flushed with hydrogen, sealed, and equipped with a hydrogen balloon to maintain a positive hydrogen pressure in the reaction vessel. This was allowed to stir overnight at room temperature. Upon completion the solution was filtered through celite, dried and taken up in ethyl acetate. The organic layer was washed with deionized water 3 times. The aqueous layer was then separated, and dried in vacuo. This residue was taken up in ethyl acetate, dried with magnesium sulfate and filtered, and again dried in vacuo, yielding 2-methyl-1,3-dioxolane-2,4-dimethanol as a champagne colored oil (5.42 g, 36.6 mmol, 68.7% yield).

Example 5

General Polymerization Procedure

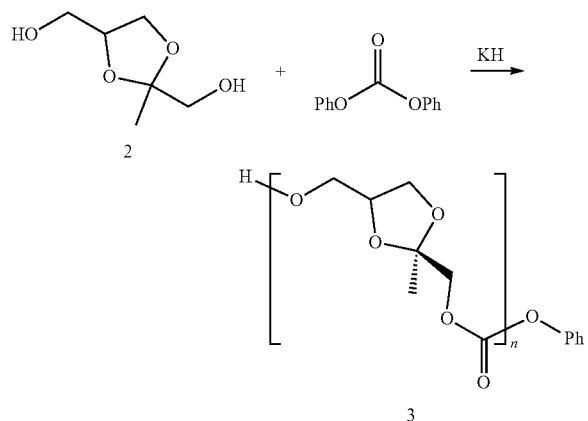

All glassware was washed and oven-dried to remove water prior to use. A round bottom flask with stir bar was connected to a Dean Stark apparatus. The flask was charged with diphenylcarbonate (14.45 g, 16 67.6 mmol, 1 eq.), potassium hydride (27.0 mg, 675 μmol, 1 mol %), and 2 (10.00 g, 67.6 mmol, 1 eq.). The vessel was then sealed and evacuated, then backfilled with nitrogen, this process was repeated 3 times, leaving the vessel under nitrogen. The flask was then lowered into a heating bath at 120° C. and vigorous stirring initiated. Hydrogen evolution could be observed at this time from deprotonation of 2, and the solution adopted a champagne color. The reaction was then heated to 220° C. and gradual vacuum was introduced in order to ensure slow, controlled evolution of phenol. As necessary, more aggressive evacuation was performed to maintain steady phenol evolution, eventually reaching a pressure of <100 mtorr. The flask was left under vacuum at <100 mtorr at 220° C. overnight. The flask was cooled, the polymer taken up in dichloromethane, washed with water and dried, resulting in glassy brown solid 3 (11.5 g, 97.8% yield based on 2).

Example 6

General Depolymerization Procedure

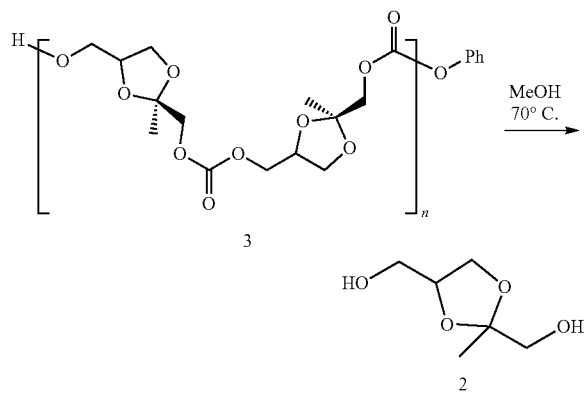

A vial equipped with magnetic stir bar was charged with poly(ketal carbonate) 3. Protic organic solvent (methanol, ethanol, phenol, etc.) was added to the vial as solvent or cosolvent with acetone. The vial was heated to 50° C. with stirring and allowed to stir for 15 hours. The solution was then allowed to cool and was dried, resulting in a brown viscous liquid. Upon completion depolymerization products were characterized via $^1$H and $^{13}$C NMR, gas chromatography, and gel permeation chromatography.

Results and Discussion

Figure 2:
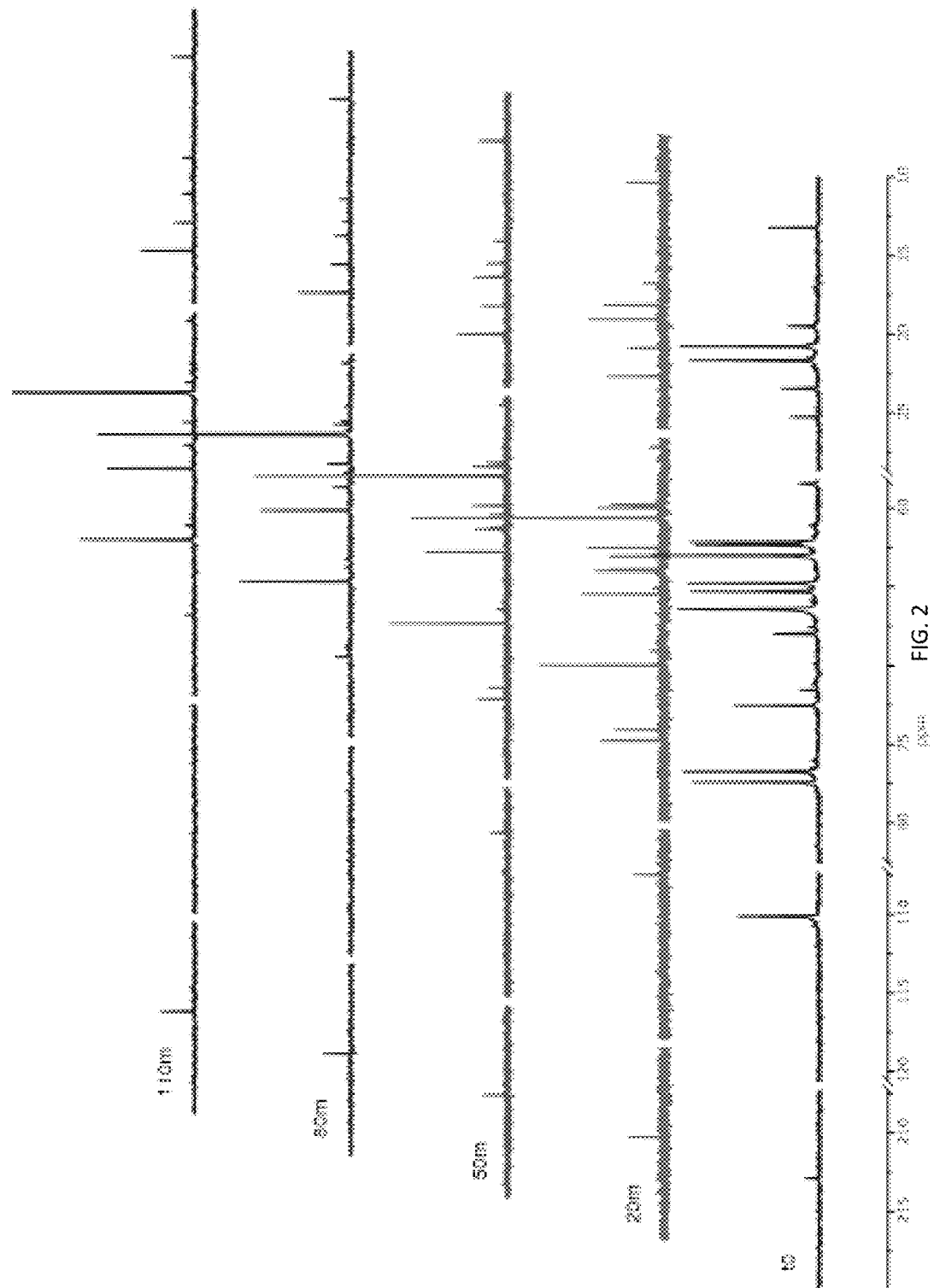
FIG. 2 provides stacked $^{13}$C NMR spectra illustrating the decomposition of compound 2 in aqueous solution at 80° C. over 120 minutes to produce hydroxyacetone and glycerol.

Direct reaction of glycerol and hydroxyacetone gave low yields and poor selectivity so an alternative improved synthetic method to this monomer was developed. Benzyl glycidyl ether and 3-(benzyloxy)-1,2-propanediol precursors were synthesized according to literature methods. Briefly, hydroxyacetone was added to 1-benzyloxy-2,3-propanediol in the presence of catalytic para-toluenesulfonic acid to afford the ketal compound 1. Compound 1 was debenzylated over palladium on carbon in the presence of hydrogen, and filtration followed by a simple workup provided pure 2. An important aspect of making a stimuli-responsive monomer is to ensure that it is selective for certain stimuli only. Compound 2 demonstrated excellent room temperature stability in water, methanol, and aqueous hydrochloric acid solutions (ph 0 to pH 7), with no decomposition being detected after one week. The ketal functionality is known to be efficiently transketalized by exposing the monomer to iodine in the presence of refluxing acetone, generating solketal and hydroxyacetone. In order to further probe the hydrolytic stability, 2 was heated to 80° C. in aqueous solution. Monomer decomposition readily occurs at elevated temperature, with full decomposition being achieved in 90 minutes (FIG. 2).

The robust stability towards hydrolysis of 2 at room temperature, but rapid decomposition at elevated temperatures is an encouraging result. The propensity of ketals towards hydrolysis is well understood, however small structural changes can have significant effects on hydrolytic stability. As increasing numbers of commercial plastics find their way to the ocean instead of being reclaimed, a polymer that will eventually—but not immediately—depolymerize to environmentally benign small molecules in water is ideal.

Figure 3:
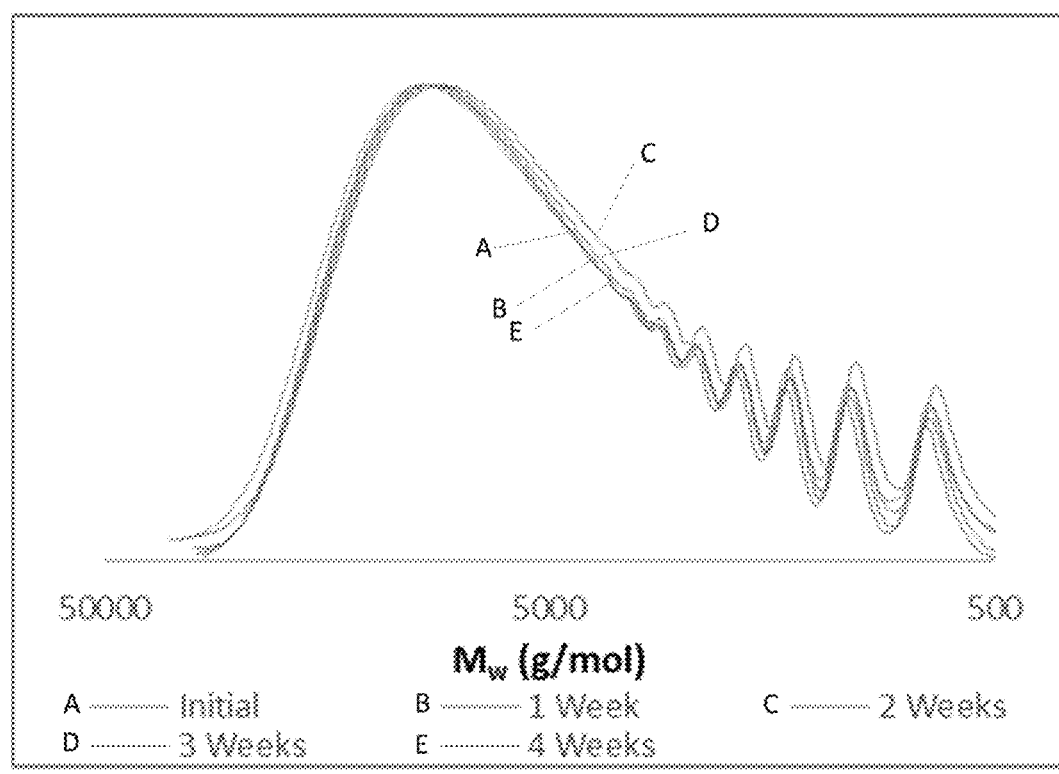
FIG. 3 is a graph providing normalized GLC traces of poly(carbonate acetal) 3 in aqueous solution at pH 1 over four weeks, and illustrating that zero change in molecular weight was observed during that time period.
Figure 4:
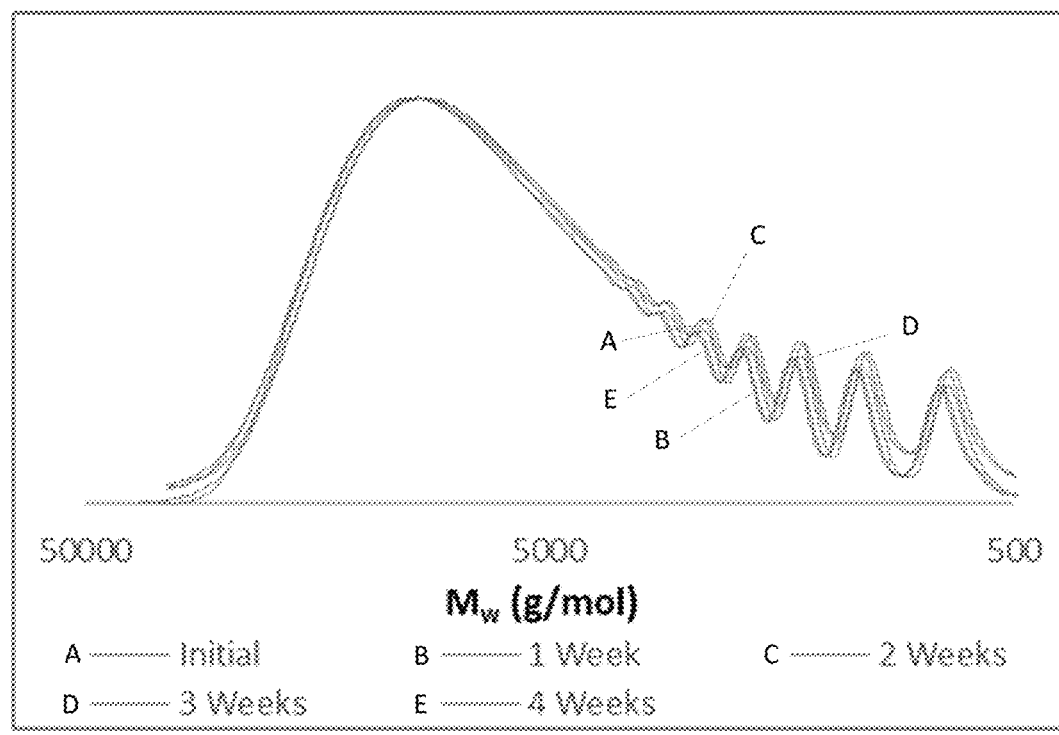
FIG. 4 is a graph providing normalized GLC traces of poly(carbonate acetal) 3 in aqueous solution at pH 7 over four weeks, and illustrating that zero change in molecular weight was observed during that time period.

Once the hydrolytic stability of 2 was determined, polycondensation was performed in neat diphenylcarbonate with catalytic (1 mol %) potassium hydride. Stirring the reaction at 220° C. while gradually introducing vacuum to ensure a steady removal of phenol produced via the transesterification reaction resulted in poly(carbonate acetal) 3 production in >95% yield. Molecular weights produced ranged from $M_n$ ~2000 g/mol up to 16,000 g/mol dependent on reaction time, temperature, and strength of vacuum. Polymer 3 was a brown glassy solid. The thermal properties of the resulting polymer were measured and found to be in good agreement with commercially available aliphatic polycarbonates. The glass transition temperatures ($T_g$) ranged from 25° C. to 35° C. depending on molecular weight and conversion, and thermal decomposition was first observed at 240° C. Surprisingly, 3 is completely resistant to degradation via aqueous hydrochloric acid solutions, showing no molecular weight change over 30 days in solutions ranging from pH 0 to pH 7 at 50° C. (FIGS. 3 and 4).

Polymer samples were also measured at elevated temperature in various organic solvents and aqueous solutions at 50° C. for 15 days, where molecular weight of the poly(carbonate acetal) was measured periodically. Table 1 provides the various test conditions and FIGS. 5-10 provide the results.

TABLE 1

Organic solvents tested for organic stability of compound 3 over a period of 15 days at 50° C.

| | Polymer | Solvent | Volume (mL) |
|---|---|---|---|
| A | poly(carbonate acetal) 3 | Methanol | 5 |
| B | poly(carbonate acetal) 3 | Methanol/Acetone | 2.5/2.5 |
| C | poly(carbonate acetal) 3 | Ethanol | 5 |
| D | poly(carbonate acetal) 3 | Water | 5 |
| E | poly(carbonate acetal) 3 | Acetone | 5 |
| F | poly(1,4-butylene carbonate) | Ethanol | 5 |

Figure 5:
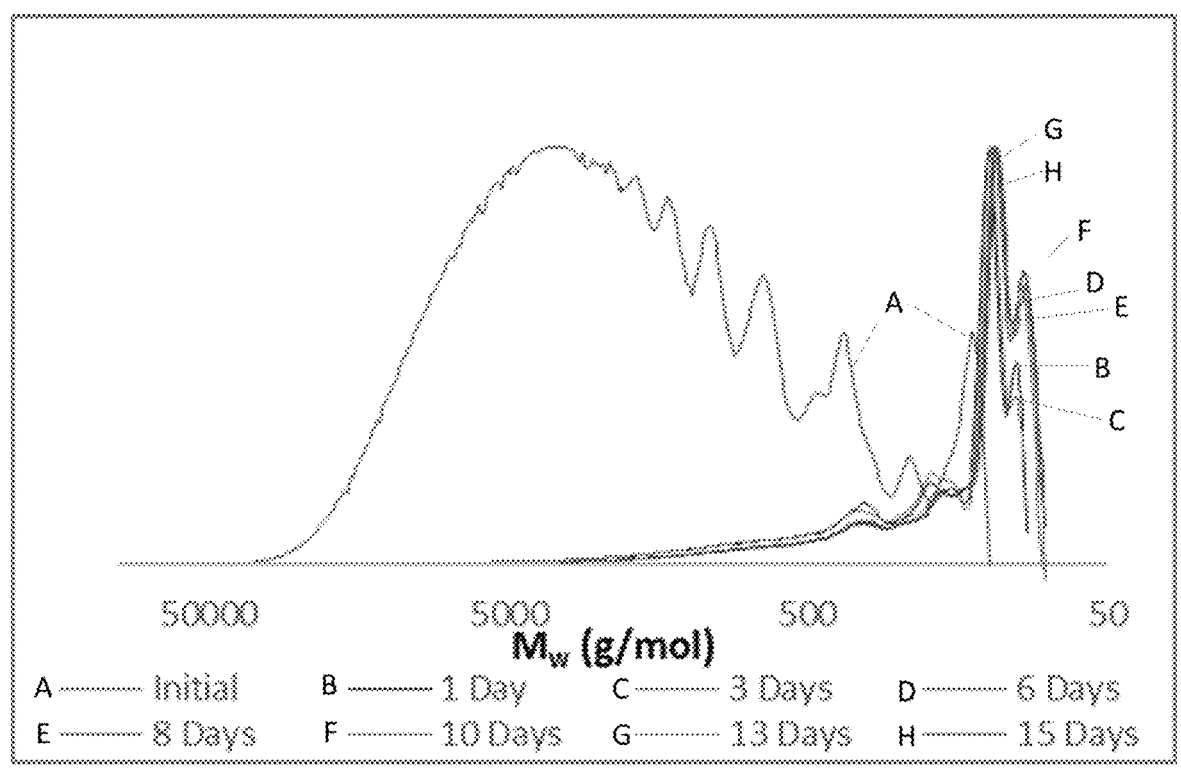
FIG. 5 is a graph providing normalized GLC traces illustrating the decomposition of poly(carbonate acetal) 3 in methanol at 50° C. for 15 days.
Figure 6:
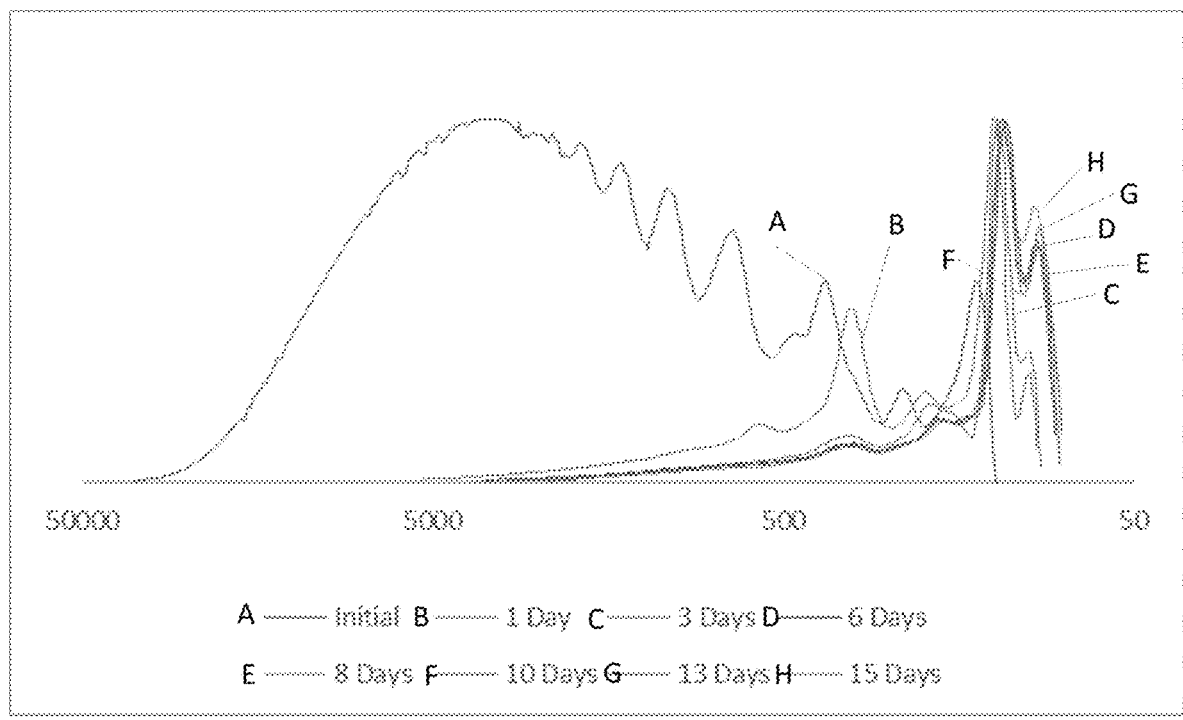
FIG. 6 is a graph providing normalized GLC traces illustrating the decomposition of poly(carbonate acetal) 3 in a 50:50 mixture of methanol and acetone at 50° C. for 15 days.
Figure 7:
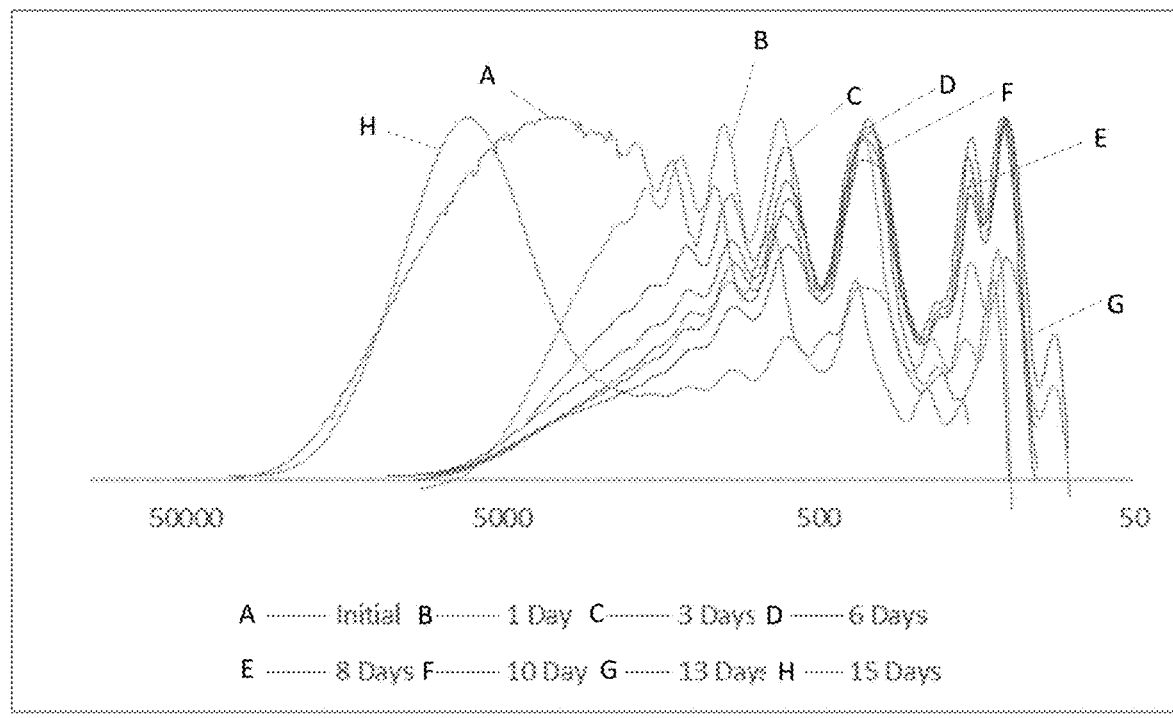
FIG. 7 is a graph providing normalized GLC traces illustrating the decomposition of poly(carbonate acetal) 3 in ethanol at 50° C. for 15 days.
Figure 8:
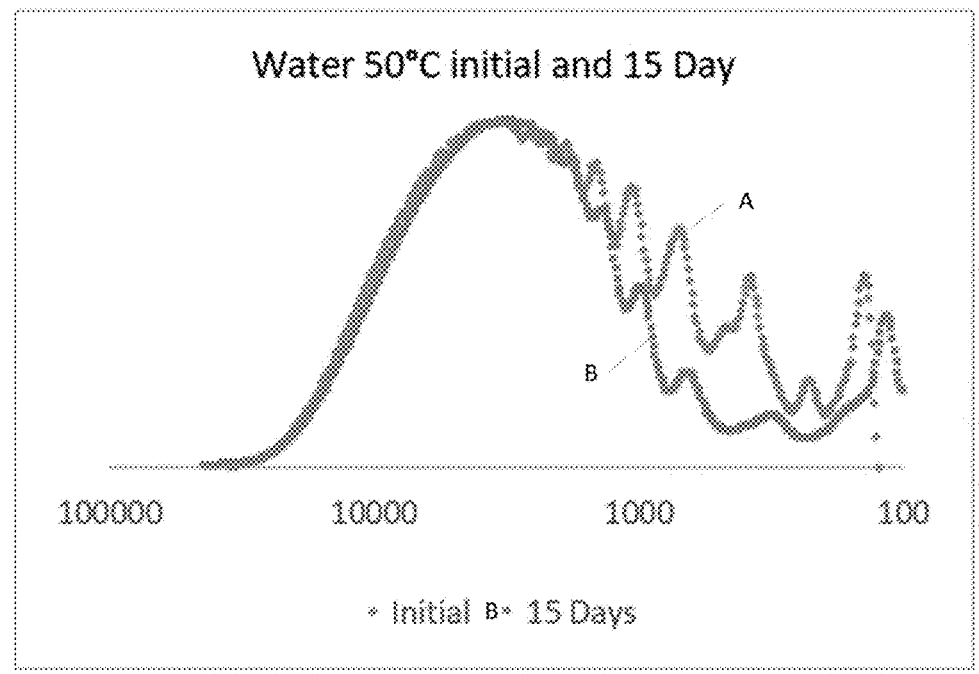
FIG. 8 is a graph providing normalized GLC traces illustrating the decomposition of poly(carbonate acetal) 3 in water at 50° C. for 15 days.
Figure 9:
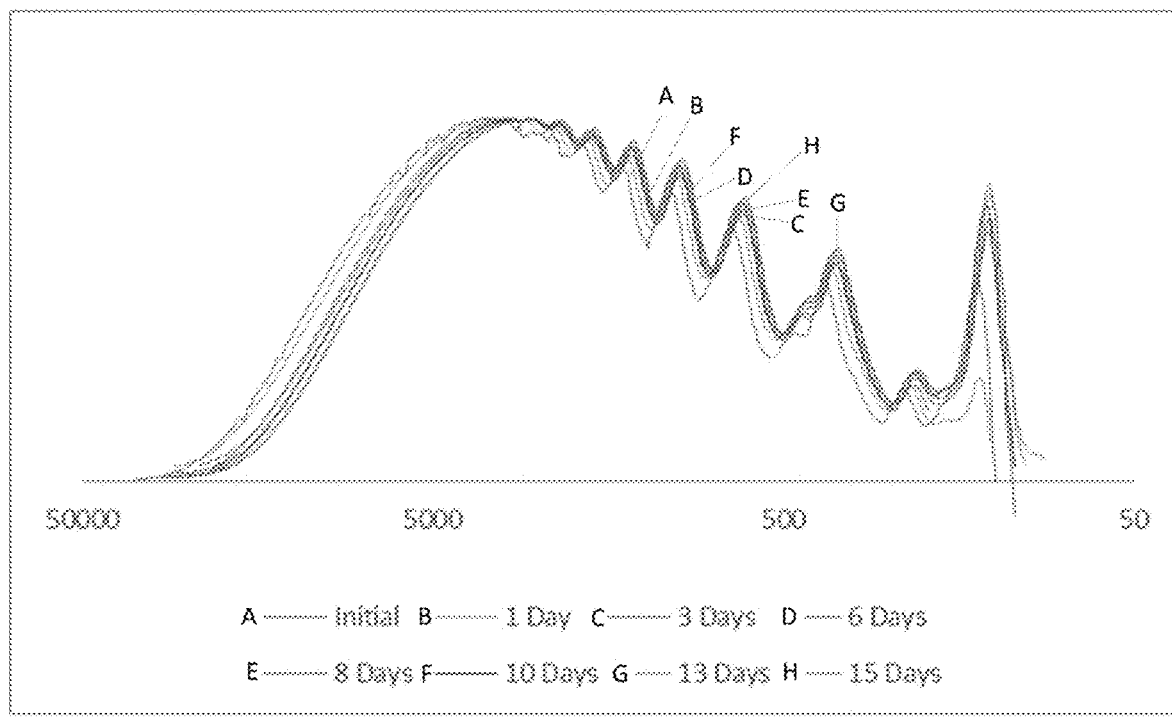
FIG. 9 is a graph providing normalized GLC traces illustrating the decomposition of poly(carbonate acetal) 3 in acetone at 50° C. for 15 days.

In a matter of 24 hours, the poly(carbonate acetal) sample placed in methanol at 50° C. had depolymerized significantly, and complete depolymerization was achieved after two days (FIG. 5). The acetone/methanol mixture demonstrated a retarded rate of decomposition, only reaching complete depolymerization of 3 after 3 days at 50° C. The sample of 3 placed in ethanol showed significant depolymerization of lower molecular weight fragments, however higher molecular weight fragments were insoluble in ethanol and did not depolymerize. The remaining higher molecular weight fragments of 3 in ethanol could readily be depolymerized by increasing the solution temperature to 70° C. Polymer 3 was completely stable in acetone, demonstrating no loss of molecular weight or increase in small molecules detected via GPC. A 50° C. solution of phenol in acetone may not cause any depolymerization, however 3 in neat phenol at elevated temperatures (>100° C.) readily depolymerizes.

Figure 10:
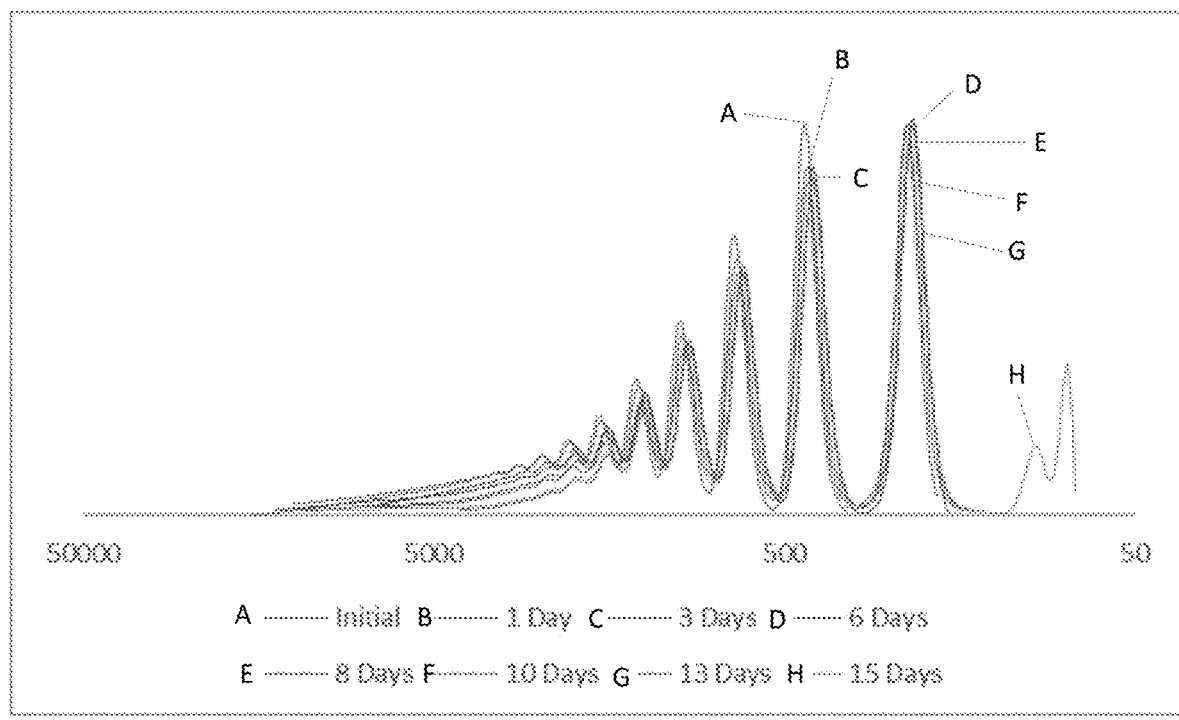
FIG. 10 is a graph providing normalized GLC traces illustrating the lack of decomposition of 1,4 butanediol carbonate in ethanol at 50° C. for 15 days.
Figure 11:
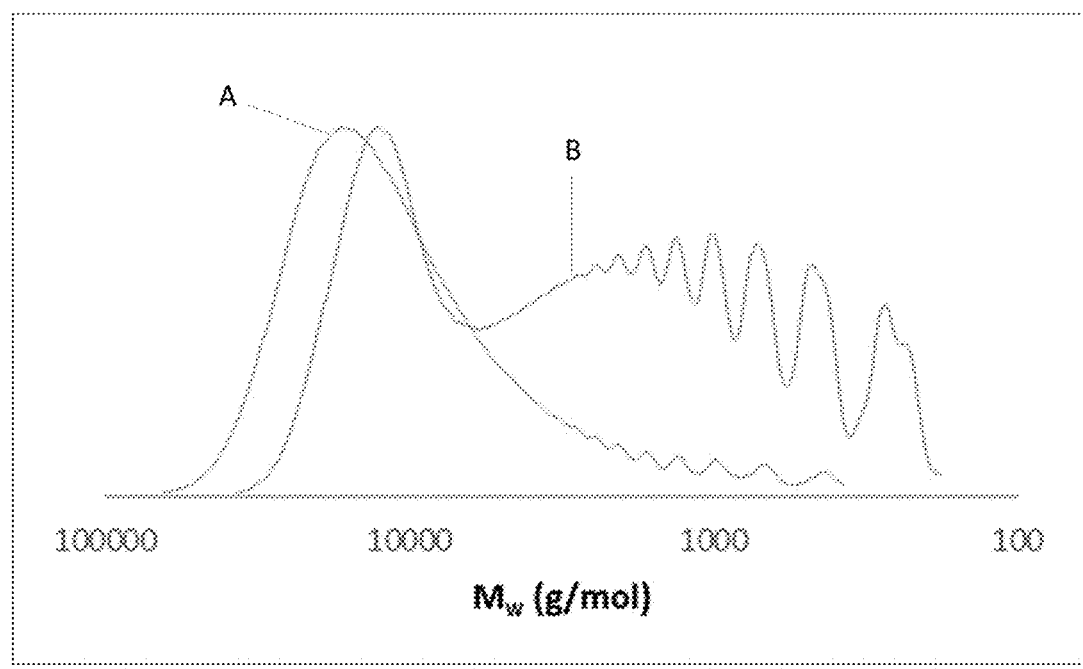
FIG. 11 is a graph providing normalized GLC traces illustrating the decomposition of 90% 1,4-butanediol carbonate and 10% 2 before (blue-A) and after (orange-B) exposure to ethanol at 70° C. for 3 days.
Figure 12:
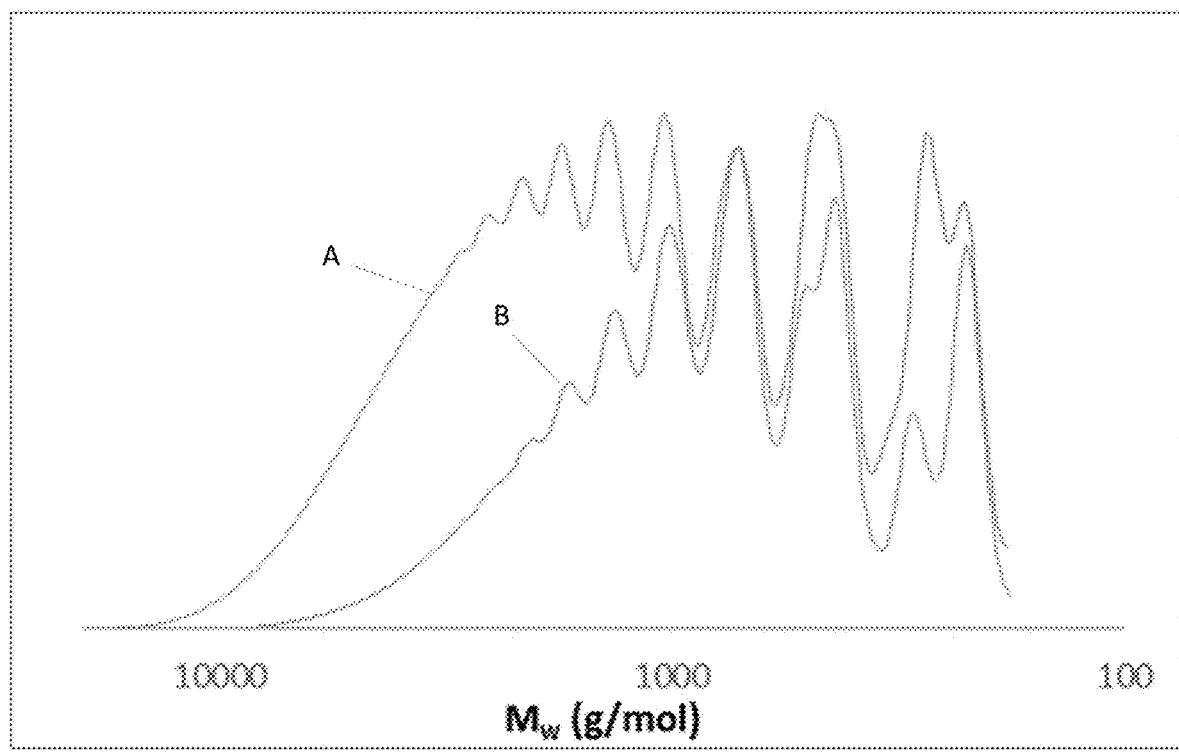
FIG. 12 is a graph providing normalized GLC traces illustrating the decomposition of 75% 1,4-butanediol carbonate and 25% 2 before (blue-A) and after (orange-B) exposure to ethanol at 70° C. for 3 days.
Figure 13:
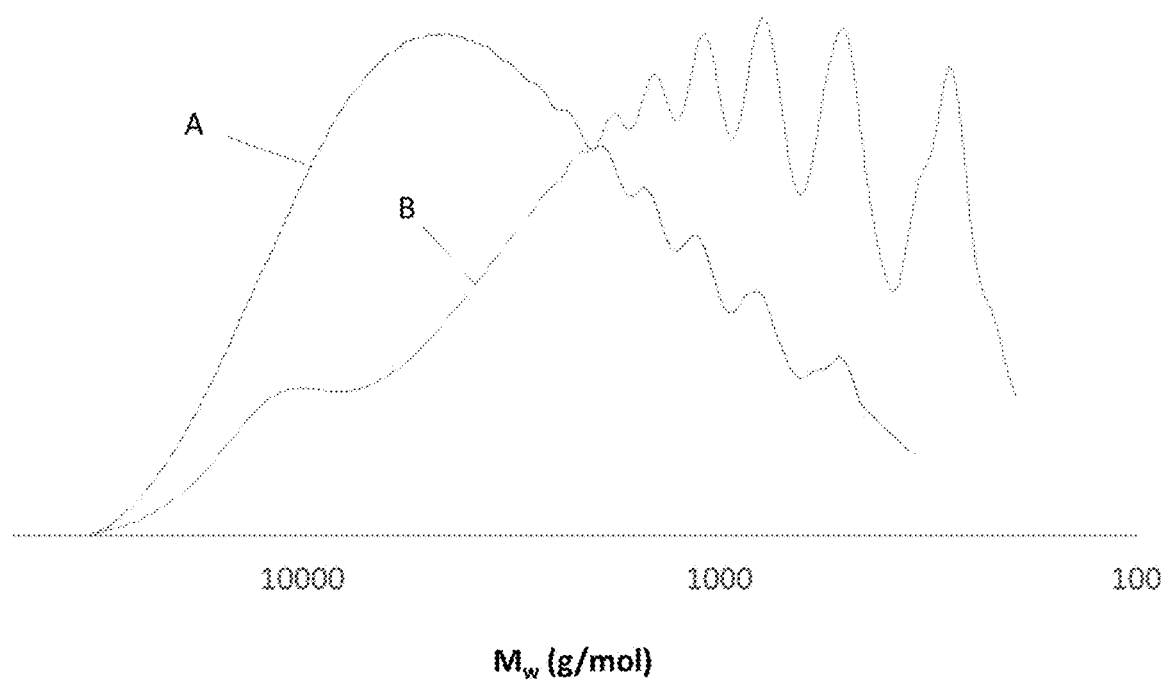
FIG. 13 is a graph providing normalized GLC traces illustrating the decomposition of 50% 1,4-butanediol carbonate and 50% 2 before (blue-A) and after (grey-B) exposure to ethanol at 70° C. for 3 days.

Another interesting observation was the complete stability of the polymer in ethanol and methanol at room temperature for one week. Polymer 3 was completely stable in polar protic solvents at room temperature but upon heating to 50° C. or above the polymer readily decomposed. The solution containing the decomposed polymer was dried and characterized in order to discern method and degree of depolymerization. There are two possible depolymerization pathways for 3, and both are solvolysis. Either transketalization or transesterification with solvent can occur at the carbonate linkage. Analysis of the isolated depolymerization product by GC, $^1$H and $^{13}$C NMR unambiguously revealed the identity of the material as compound 2, which can be isolated in quantitative yield from the poly(carbonate acetal) 3. The release of monomer during decomposition is indicative of a transesterification mechanism at the carbonate linkages. Polycarbonate decomposition has been reported in this fashion but typically when using enzymatic or catalytic decomposition techniques. The depolymerization reaction proceeded more rapidly with a catalytic amount of base added, but addition of base was not necessary to achieve full depolymerization. As a control experiment, oligomeric poly(1,4-butylenecarbonate) samples were taken up in ethanol alongside poly(carbonate acetal) 3. No depolymerization was observed in the poly(1,4-butylenecarbonate) over 15 days, indicating that facile depolymerization was promoted by incorporation of compound 2 into the polymer chain (FIG. 10). This could also be observed in copolymers containing both 2 and 1,4 butanediol, the degree of decomposition was directly proportional to the degree of incorporation of 2 (FIGS. 11 to 13).

To ensure that no transacetalization was occurring during depolymerization, test reactions with 2, glycerol, and hydroxyacetone were performed under identical conditions to depolymerization. Compound 2 did not undergo transketalization with solvent, and hydroxyacetone and glycerol did not react to form 2 in methanol at 50° C. Rather, hydroxyacetone readily ketalized with methanol to form 2,2-dimethoxy-1-propanol. The dimethoxy acetal was never observed at any stage of the depolymerization reactions, indicating that no transacetalization of 2 occurred. Depolymerization was also monitored via NMR spectroscopy, which confirmed that no depolymerization occurred at room temperature in a 50:50 Acetone-$d_6$/Methanol-$d_4$ solution. The sample of 3 in a 50:50 Acetone-$d_6$/Methanol-$d_4$ solution was then heated for three days at 50° C. and depolymerization progress was monitored. Formation of several sets of new peaks consistent with pure monomer are observed, along with peaks consistent with dimethylcarbonate at 3.68 ppm in the $^1$H NMR spectrum and at 52.46 ppm and 154.7 ppm in the $^{13}$C NMR spectrum. The presence of dimethylcarbonate in solution was unambiguously confirmed by spiking the solution with authentic dimethylcarbonate, suggesting that this could also be recovered and reused in an industrial recycling facility.

It is encouraging to see that this chemical recycling pathway not only remains available to bioderived poly(carbonate acetal) 3, but perhaps is more accessible than in polycarbonates derived from non-renewable sources. Compound 2 isolated from the depolymerization of poly(carbonate acetal) 3 can be used identically to virgin 2.

TABLE 2

Molecular weights and physical properties of virgin 3 and subsequent repolymerization of 2 to generate recycled 3. Six cycles shown.

| Polymerization | $M_w$ | PDI | $T_g$ | Yield | Recovery of 2 |
|---|---|---|---|---|---|
| 1 | 2743 | 2.58 | 24.3 | 87.6% | Quant. |
| 2 | 7712 | 3.71 | 28.1 | 93.0% | Quant. |
| 3 | 9680 | 3.54 | 35.1 | 66.7% | Quant. |
| 4 | 6454 | 4.29 | 26.3 | 79.4% | Quant. |
| 5 | 4296 | 3.18 | 15 | 78.8% | Quant. |
| 6 | 4964 | 3.92 | 23.9 | 87.2% | N/A |

Figure 14:
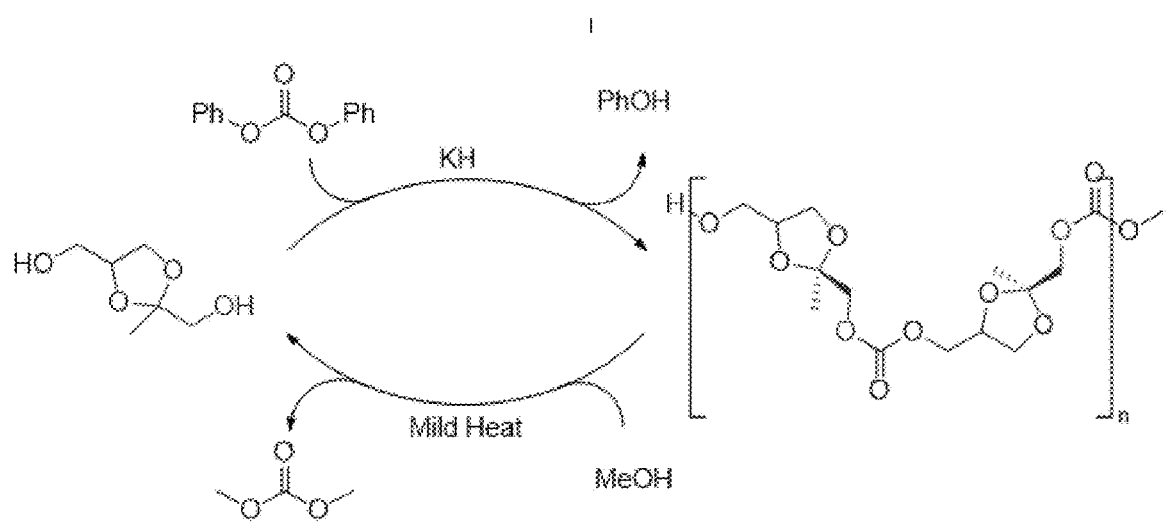
FIG. 14 is a schematic diagram illustrating the "closed-loop" life cycle of 2, and demonstrating how compound 2 can be polymerized and recovered reversibly.
Figure 15:
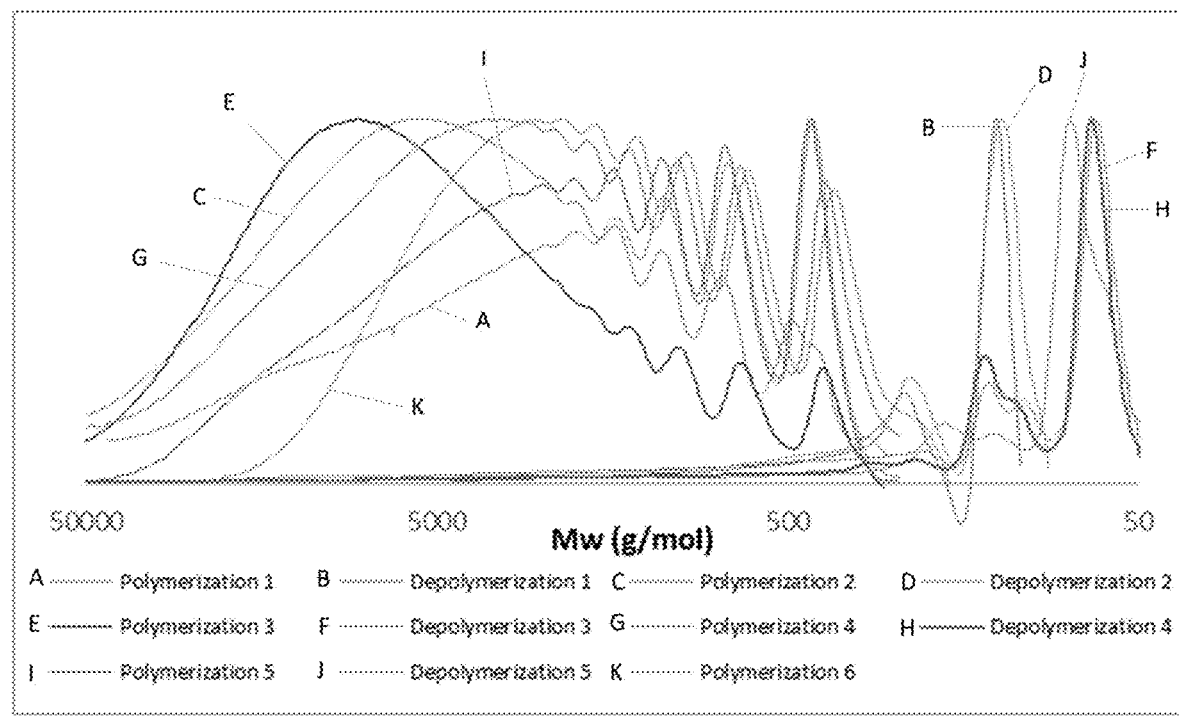
FIG. 15 is a graph providing the overlaid normalized GCL spectra for polymerization and depolymerization curves 1-6 for polymerization and recovery of 2.

When repolymerizing, there did not appear to be any difference between virgin 3 and 3 produced using 2 recovered via depolymerization (FIG. 15). No irreversible addition to the polymer chain was observed, as >95% of the monomer could be recovered from a polymerized sample and no other small molecules or side products were detected by GC. Yields when repolymerizing were comparable to the use of virgin monomer, and after six cycles of decomposition and repolymerization there were no differences between virgin 3 and 3 recycled several times. After every cycle, the thermal properties of 3 were measured, and there was no significant change in the glass transition temperature due to depolymerization/repolymerization. Compound 2 demonstrated a seemingly perpetual ability to be recycled, leading to the closed loop monomer life cycle shown in FIG. 14.

Figure 16:
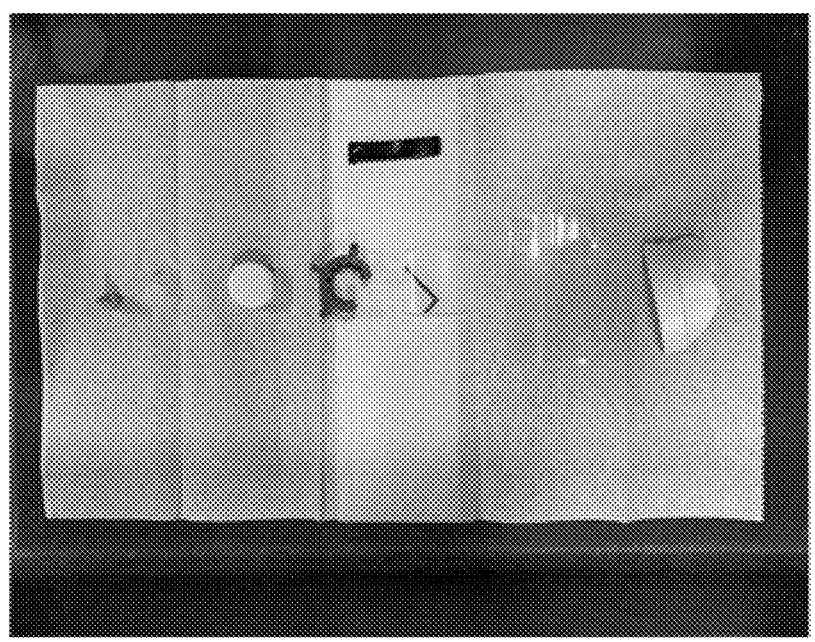
FIG. 16 is a digital image showing the mixture of plastic objects used to simulate mixed plastic waste, from left to right, polyether ether ketone (PEEK), polyethylene, polyurea, polyoxomethylene, polypropylene, polystyrene, and 3.
Figure 17:
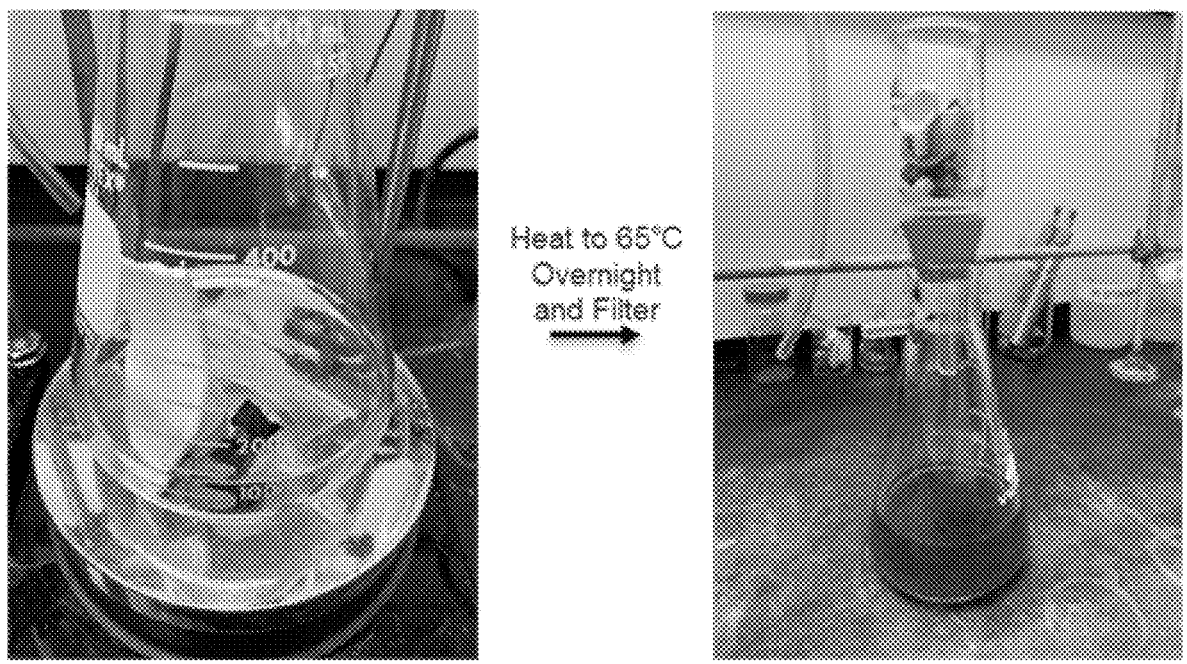
FIG. 17 is a digital image illustrating the laboratory experiment comprising submerging the mixed plastic waste from FIG. 16 in methanol and heating overnight before filtering off any insoluble material.
Figure 18:
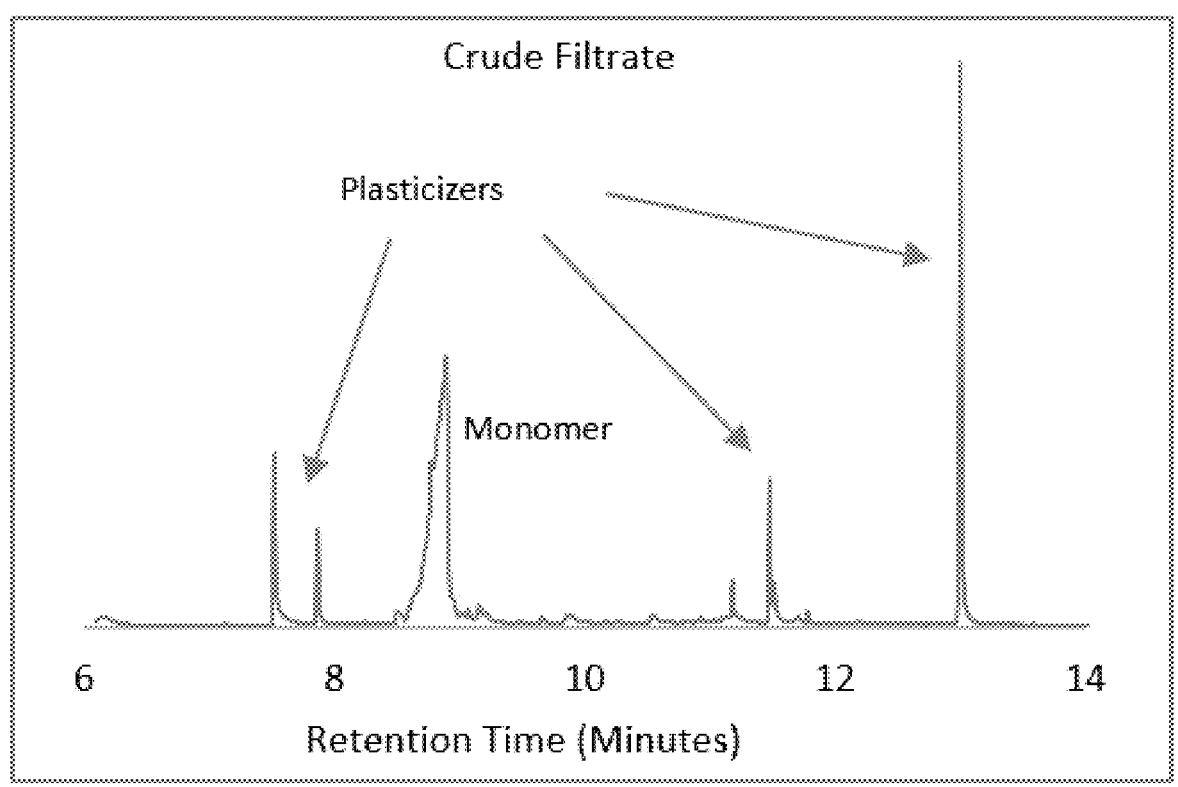
FIG. 18 is the GC spectra from the crude filtrate from the apparatus shown in FIG. 17.
Figure 19:
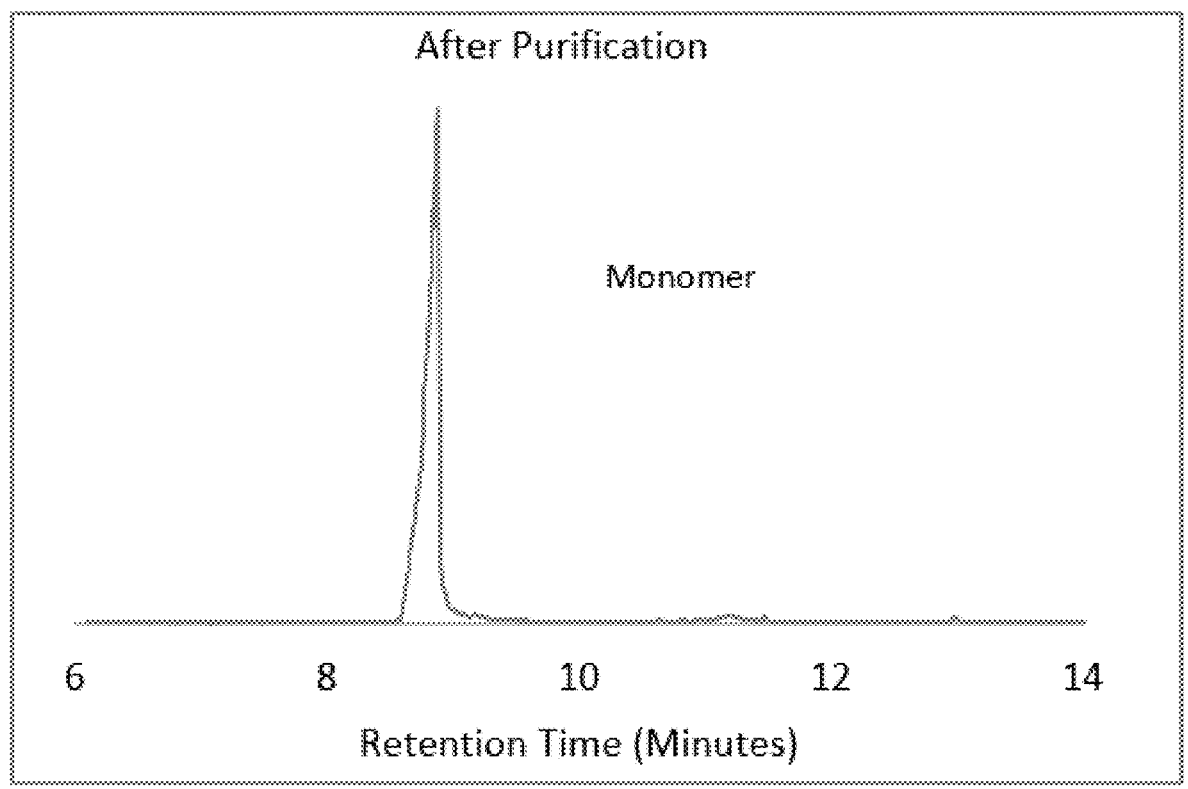
FIG. 19 is the GC spectra of the filtrate from FIG. 18 after purification, illustrating the single peak corresponding to recycled monomer.

It is an encouraging result to be able to isolate pure, usable monomer from an authentic, pure polymer sample, but typically plastic waste is not recovered in such a manner. Plastic waste is often collected as a mixture of plastics which are then separated later at recycling facilities. If 3 cannot be isolated from a sample of mixed plastics, then the recyclability is moot. To investigate this a simulated mixed plastic waste environment was created, containing polyether ether ketone (PEEK), polyethylene, polyurea, polyoxomethylene, polypropylene, polystyrene, and 3 (FIG. 16). The mixed plastic sample was submerged in methanol and heated to 65° C. overnight with stirring. Polymer 3 completely dissolved, while none of the other plastics were methanol soluble (FIG. 17). Taking the mixed plastic suspension and filtering out all insoluble material afforded a methanol solution of 2 and various plasticizers in the filtrate (FIG. 18). By drying this solution and washing with ethyl acetate, the plasticizers could be removed, providing pure 2 in good yield (60%) (FIG. 19). As expected, 2 isolated this way can be repolymerized affording 3. While the yield of 2 is not as impressive as that isolated from a pure sample of 3, being able to successfully extract monomer from a mixed plastic waste stream is remarkable and speaks to the viability of these polymers in a real-world recycling environment.

Conclusion

The disclosure demonstrates that a ketal monomer made from bioderived glycerol and hydroxyacetone is a viable monomer for polycondensation with aryl carbonates in high yield (>95%). Poly(carbonate acetal) 3 demonstrated comparable thermal properties to commercially available aliphatic polycarbonates while utilizing cheap bioderived monomers based on glycerol. Most importantly, the monomers developed this way are readily recovered in >95% yield from the polymer through mild heating. The recovered monomer can be used as effectively as virgin monomer, and shows no significant difference in polymer thermal properties after five cycles of polymerization/depolymerization. Additionally, the disclosure demonstrated that the monomer will hydrolyze over time back to the original building blocks glycerol and hydroxyacetone. And based on current chemical safety data sheets (SDS) these materials are not toxic or carcinogenic. This also may allow for safe degradation and excretion if consumed by animals. This material also degrades under simple conditions, ultimately to the original building blocks, which has the potential to prevent environmental and bio-accumulation if they are accidentally released to the environment.

VI. Exemplary Embodiments

The following numbered paragraphs illustrate exemplary embodiments of the disclosed technology.

Paragraph 1. A method, comprising:

forming a mixture comprising a monomer compound according to Formula I, a carbonyl compound according to Formula III, and a base;

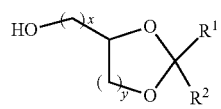

Formula I

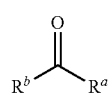

Formula III heating the mixture to a first temperature of from 80° C. to 150° C. for a first time period;

heating the mixture to a second temperature of from greater than 150° C. to 300° C. for a second time period; and isolating a polymer according to Formula II

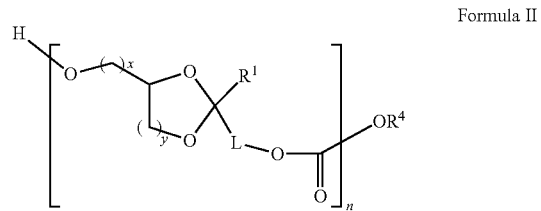

Formula II wherein
$R^1$ is alkyl or OH;
$R^2$ is aliphatic substituted with OH;
$R^4$ is H, $C_{1-6}$alkyl, or phenyl;
each of $R^a$ and $R^b$ independently is Cl, $OCCl_3$, OPh, or $OC_{1-6}$alkyl;
L is $C_{1-6}$alkyl or $C_{2-6}$alkenyl;
n is 2 to 500;
x is 1, 2, 3, 4, 5 or 6; and
y is 1 or 2.

Paragraph 2. The method of paragraph 1, wherein the base is a hydride base.

Paragraph 3. The method of paragraph 2, wherein the hydride base is potassium hydride, or sodium hydride.

Paragraph 4. The method of any one of paragraphs 1-3, wherein the carbonyl compound is diphenyl carbonate.

Paragraph 5. The method of any one of paragraphs 1-4, wherein the method further comprises introducing a vacuum while heating to the second temperature.

Paragraph 6. The method of paragraph 5, wherein the vacuum reaches a pressure of less than 500 mtorr.

Paragraph 7. The method of paragraph 6, wherein the vacuum reaches a pressure of from greater than zero to 250 mtorr.

Paragraph 8. The method of any one of paragraphs 1-7, wherein the mixture further comprises a solvent.

Paragraph 9. The method of any one of paragraphs 1-8, wherein x is 1.

Paragraph 10. The method of any one of paragraphs 1-9, wherein y is 1.

Paragraph 11. The method of any one of paragraphs 1-10, wherein $R^2$ is -L-OH.

Paragraph 12. The method of paragraph 11, wherein the monomer compound has a structure according to Formula I-B:

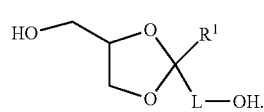

Formula I-B

Paragraph 13. The method of any one of paragraphs 1-12, wherein $R^1$ is OH or $CH_3$.

Paragraph 14. The method of any one of paragraphs 1-13, wherein L is $C_{1-6}$alkyl.

Paragraph 15. The method of any one of paragraphs 11-14, wherein $R^1$ is $CH_3$.

Paragraph 16. The method of any one of paragraphs 1-15, wherein the monomer compound is selected from:

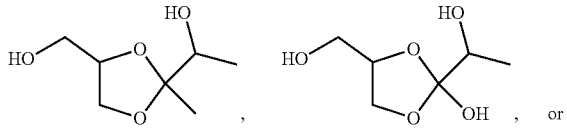

-continued

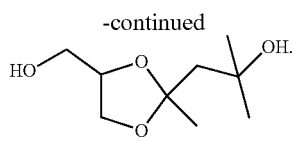

Paragraph 17. The method of paragraph 1 wherein the polymer is

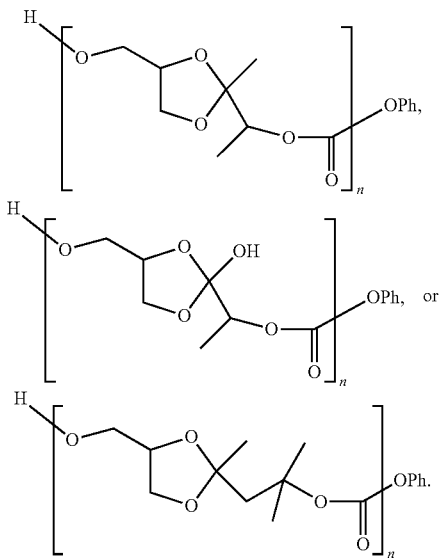

Paragraph 18. The method of any one of paragraphs 1-7, wherein the first time period is from greater than zero to 4 hours.

Paragraph 19. The method of any one of paragraphs 1-18, wherein the second time period is from greater than zero to 36 hours.

Paragraph 20. A method, comprising:
forming a mixture comprising a protic organic solvent and a polymer according to any one of paragraphs 1-19; and
heating the mixture to a temperature of from 30° C. to 150° C.

Paragraph 21. The method paragraph 20, wherein the temperature is from 40° C. to 100° C.

Paragraph 22. The method of paragraph 20 or paragraph 21, wherein the mixture is heated for a time period of from greater than zero to 7 days.

Paragraph 23. The method of paragraph 22, wherein the time period is from 12 hours to 3 days.

Paragraph 24. The method of any one of paragraphs 20-23, wherein the protic organic solvent is an aliphatic alcohol or an aromatic alcohol.

Paragraph 25. The method of paragraph 24, wherein the aliphatic alcohol is methanol, ethanol, propanol, or a combination thereof.

Paragraph 26. The method of paragraph 25, wherein the aliphatic alcohol is methanol.

Paragraph 27. The method of paragraph 24, wherein the aromatic alcohol is phenol.

28. The method of any one of paragraphs 20-27, wherein the mixture further comprises a co-solvent.

Paragraph 29. The method of paragraph 28, wherein the co-solvent is acetone, toluene, xylene, methyl ethyl ketone, dimethylformamide, acetonitrile, or a combination thereof.

Paragraph 30. The method of paragraph 20, wherein the protic organic solvent is methanol, and the mixture is heated to a temperature of from 40° C. to 75° C. for 3 days.

Paragraph 31. The method of any one of paragraphs 20-30, further comprising isolating a recycled monomer.

Paragraph 32. The method of paragraph 31, further comprising forming a recycled polymer using the recycled monomer.

Paragraph 33. A method for recycling a polymer, comprising:
forming a mixture comprising a protic organic solvent and a polymer according to any one of paragraphs 1-19;
heating the mixture to a temperature of from 30° C. to 150° C.;
isolating a recycled monomer; and
forming a recycled polymer using the recycled monomer.

Paragraph 34. The method of paragraph 33, comprising:
forming a mixture comprising an aliphatic alcohol and the polymer according to any one of paragraphs 1-19;
heating the mixture to a temperature of from 40° C. to 100° C. for a time period of from 12 hours to 3 days;
isolating the recycled monomer; and
forming the recycled polymer using the recycled monomer.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method, comprising:
forming a first mixture comprising a protic organic solvent, a co-solvent, and a first polymer according to Formula II Formula II

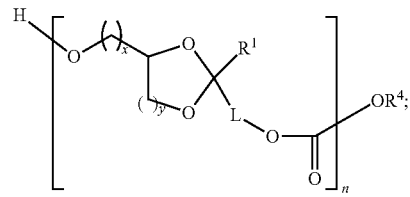

heating the first mixture to a temperature of from 40° C. to 75° C. for 3 days;
isolating a recycled monomer compound according to Formula I from the first mixture Formula I

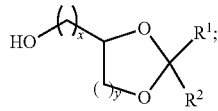

forming a second mixture comprising the recycled monomer compound according to Formula I, a carbonyl compound according to Formula III, and a base;

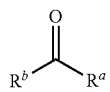

Formula III heating the second mixture to a first temperature of from 80° C. to 150° C. for a first time period;
heating the second mixture to a second temperature of from greater than 150° C. to 300° C. for a second time period; and
isolating a second polymer according to Formula II

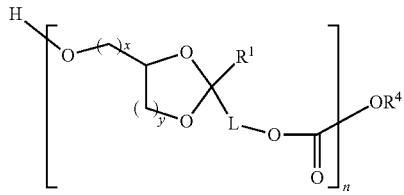

Formula II wherein
$R^1$ is alkyl or OH;
$R^2$ is aliphatic substituted with OH;
each $R^4$ independently is H, $C_{1-6}$alkyl, or phenyl;
each of $R^a$ and $R^b$ independently is Cl, $OCCl_3$, OPh, or $OC_{1-6}$alkyl;
L is $C_{1-6}$alkyl or $C_{2-6}$alkenyl;
each n independently is 2 to 500;
x is 1, 2, 3, 4, 5 or 6; and
y is 1 or 2.

2. The method of claim 1, wherein the base is a hydride base.

3. The method of claim 1, wherein the carbonyl compound is diphenyl carbonate.

4. The method of claim 1, wherein the method further comprises introducing a vacuum while heating to the second temperature.

5. The method of claim 4, wherein the vacuum reaches a pressure of less than 500 mtorr.

6. The method of claim 1, wherein:
x is 1; or
y is 1; or
both x and y are 1.

7. The method of claim 1, wherein $R^2$ is -L-OH.

8. The method of claim 7, wherein the monomer compound has a structure according to Formula I-B:

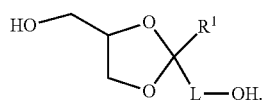

Formula I-B

9. The method of claim 1, wherein:
$R^1$ is OH or $CH_3$;
L is $C_{1-6}$alkyl;
or a combination thereof.

10. The method of claim 9, wherein $R^1$ is $CH_3$.

11. The method of claim 1, wherein the monomer compound is selected from:

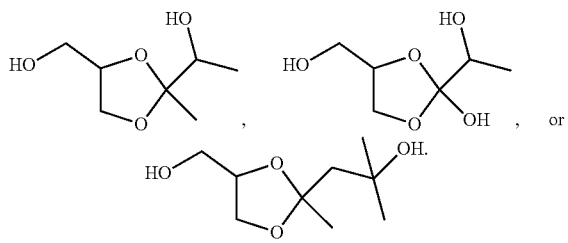

12. The method of claim 1 wherein the polymer is

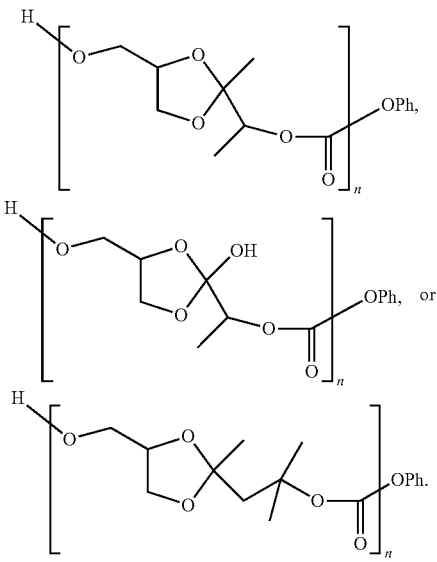

13. The method of claim 1, wherein:
the first time period is from greater than zero to 4 hours;
the second time period is from greater than zero to 36 hours;
or a combination thereof.

14. The method of claim 1, wherein the protic organic solvent is an aliphatic alcohol, an aromatic alcohol, or a combination thereof.

15. The method of claim 14, wherein:
the aliphatic alcohol is methanol, ethanol, propanol, or a combination thereof;
the aromatic alcohol is phenol;
or a combination thereof.

16. The method of claim 1, wherein the protic organic solvent is methanol.

\* \* \* \* \*